US006963795B2

United States Patent
Haissig et al.

(10) Patent No.: US 6,963,795 B2
(45) Date of Patent: Nov. 8, 2005

(54) VEHICLE POSITION KEEPING SYSTEM

(75) Inventors: Christine M. Haissig, Chanhassen, MN (US); Paul P. Samanant, Eden Prairie, MN (US); Dale Enns, Roseville, MN (US); Eric Euteneuer, Minneapolis, MN (US)

(73) Assignee: Honeywell Interntaional Inc., Morristown, NJ (US)

( * ) Notice: Subject to any disclaimer, the term of this patent is extended or adjusted under 35 U.S.C. 154(b) by 259 days.

(21) Appl. No.: 10/198,491

(22) Filed: Jul. 16, 2002

(65) Prior Publication Data

US 2005/0165516 A1 Jul. 28, 2005

(51) Int. Cl.[7] .............................. G05D 1/00; G06F 7/00; G06F 19/00
(52) U.S. Cl. .............................. 701/7; 701/301; 342/29; 342/104
(58) Field of Search .......................... 701/4–9, 11, 221, 701/301, 213; 342/29, 30, 36, 455, 465, 179, 181, 107, 126, 104; 340/972

(56) References Cited

U.S. PATENT DOCUMENTS

| 4,442,491 A | * | 4/1984 | Olhausen, Jr. ............... 701/221 |
| 4,674,710 A | | 6/1987 | Rodriguez |
| 5,043,903 A | * | 8/1991 | Constant ..................... 701/300 |
| 5,521,817 A | | 5/1996 | Burdoin et al. .............. 364/423 |
| 5,992,065 A | | 11/1999 | Preiser |
| 6,262,679 B1 | * | 7/2001 | Tran ............................. 342/29 |
| 6,271,768 B1 | | 8/2001 | Frazier, Jr. et al. .......... 340/961 |
| 6,278,396 B1 | | 8/2001 | Tran ............................. 342/29 |
| 6,314,366 B1 | | 11/2001 | Farmakis et al. ............ 701/201 |
| 6,531,978 B2 | * | 3/2003 | Tran ............................. 342/29 |
| 6,542,796 B1 | * | 4/2003 | Gibbs et al. .................... 701/3 |
| 6,567,014 B1 | * | 5/2003 | Hansen et al. ............... 340/980 |
| 6,571,171 B1 | * | 5/2003 | Pauly ........................... 701/206 |
| 2002/0011950 A1 | | 1/2002 | Frazier et al. .......... 342/357.08 |
| 2003/0016158 A1 | * | 1/2003 | Richard ....................... 359/883 |
| 2003/0137444 A1 | * | 7/2003 | Stone et al. ................... 342/30 |

FOREIGN PATENT DOCUMENTS

WO    WO 0235497    5/2002

OTHER PUBLICATIONS

H. Kim et al., Fuzzy Throttle and Brake Control for Platoons of Smart Cars, Elsevier Fuzzy Sets and Systems, vol. 84, 1996 pp. 209–304, The Netherlands.

* cited by examiner

*Primary Examiner*—Jack Keith
*Assistant Examiner*—Ronnie Mancho
(74) *Attorney, Agent, or Firm*—Black Lowe & Graham PLLC

(57) ABSTRACT

A position keeping system, useable to maintain a position of a vehicle in a vehicle formation, to keep all formation members flying at a specified velocity and altitude, and to perform commanded maneuvers, determines guidance corrections based on a track state referenced to a leader or a virtual leader of the formation and on a formation position error indicating the error in the position of the vehicle in the formation. The guidance corrections are required so as to maintain the vehicles in the formation.

97 Claims, 17 Drawing Sheets

TOP

SIDE

REAR

| SIMPLE MANEUVER | TRACK STATE | | | COMMANDED MANEUVER TRACK RATE | | |
|---|---|---|---|---|---|---|
| | $v_{TRACK}$ | $x_{TRACK}$ | $\gamma_{TRACK}$ | $v_{DOTTRACK}$ | $x_{DOTTRACK}$ | $\gamma_{DOTTRACK}$ |
| POSITIONKEEPING ONLY (NO COMMANDED MANEUVERS) | $v_{COM}$ | $x_{COM}$ | 0 | 0 | 0 | 0 |
| EXECUTING SIMULTANEOUS ALTITUDE CHANGE | $v_{COM}$ | $x_{COM}$ | $ARCSIN(h_{DOTCOM}/v_{TRACK})$ | 0 | 0 | 0 |
| EXECUTING SIMULTANEOUS SPEED CHANGE | $v_L(t)$ | $x_{COM}$ | 0 | $v_{DOTCOM}$ | 0 | 0 |
| EXECUTING SIMULTANEOUS TURN | $v_L(t) \pm \Delta v_{TURN}(t)$ | $x_L(t)$ | 0 | 0 | $x_{DOTCOM}$ | 0 |
| ALL PENDING MANEUVERS | $x_L^{PK}(t_{STARTMAN}) - x_F^{PK}(t))/(t_{STARTMAN} - t)$ | $x_{COM}$ | 0 | 0 | 0 | 0 |
| EXECUTING SEQUENTIAL ALTITUDE CHANGE | $v_{COM}$ | $x_{COM}$ | $ARCSIN(h_{DOTCOM}/v_{TRACK})$ | 0 | 0 | 0 |
| EXECUTING SEQUENTIAL SPEED CHANGE | $v_L(t - t_{DELAY})$ | $x_{COM}$ | 0 | $v_{DOTCOM}$ | 0 | 0 |
| EXECUTING SEQUENTIAL TURN | $v_L(t - t_{DELAY}) \pm \Delta v_{TURN}(t - t_{DELAY})$ | $x_L(t - t_{DELAY})$ | 0 | 0 | $x_{DOTCOM}$ | 0 |
| EXECUTING DROP MANEUVER | $v_{COM}$ | $\psi_{WAYPOINT}$ | 0 | 0 | 0 | 0 |

*Fig. 15.*

| COMBINED MANEUVER | TRACK STATE | | | COMMANDED MANEUVER TRACK RATE | | |
|---|---|---|---|---|---|---|
| | $v_{TRACK}$ | $x_{TRACK}$ | $\gamma_{TRACK}$ | $v_{DOTTRACK}$ | $x_{DOTTRACK}$ | $\gamma_{DOTTRACK}$ |
| POSITIONKEEPING ONLY (NO COMMANDED MANEUVERS) | $v_{COM}$ | $x_{COM}$ | 0 | 0 | 0 | 0 |
| EXECUTING SIMULTANEOUS ALTITUDE AND SPEED CHANGE | $v_L(t)$ | $x_{COM}$ | $ARCSIN(h_{DOTCOM}/v_{TRACK})$ | $v_{DOTCOM}$ | 0 | 0 |
| EXECUTING SIMULTANEOUS ALTITUDE CHANGE & TURN | $v_L(t) \pm \Delta v_{TURN}(t)$ | $x_L(t)$ | $ARCSIN(h_{DOTCOM}/v_{TRACK})$ | 0 | $x_{DOTCOM}$ | 0 |
| EXECUTING SIMULTANEOUS TURN AND SPEED CHANGE | $v_L(t) \pm \Delta v_{TURN}(t)$ | $x_L(t)$ | 0 | $v_{DOTCOM}$ | $x_{DOTCOM}$ | 0 |
| EXECUTING SIMULTANEOUS TURN & SPEED & ALTITUDE CHANGE | $v_L(t) \pm \Delta v_{TURN}(t)$ | $x_L(t)$ | $ARCSIN(h_{DOTCOM}/v_{TRACK})$ | $v_{DOTCOM}$ | $x_{DOTCOM}$ | 0 |
| ALL PENDING MANEUVERS | $x_L^{PK}(t_{STARTMAN}) - x_F^{PK}(t))/(t_{STARTMAN} - t)$ | $x_{COM}$ | 0 | 0 | 0 | 0 |
| EXECUTING SEQUENTIAL ALTITUDE & SPEED CHANGE | $v_{COM}(t - t_{DELAY})$ | $x_{COM}$ | $ARCSIN(h_{DOTCOM}/v_{TRACK})$ | $v_{DOTCOM}$ | 0 | 0 |
| EXECUTING SEQUENTIAL ALTITUDE CHANGE & TURN | $v_L(t - t_{DELAY})$ | $x_L(t - t_{DELAY})$ | $ARCSIN(h_{DOTCOM}/v_{TRACK})$ | 0 | $x_{DOTCOM}$ | 0 |
| EXECUTING SEQUENTIAL TURN & SPEED CHANGE | $v_L(t - t_{DELAY}) \pm \Delta v_{TURN}(t)$ | $x_L(t - t_{DELAY})$ | 0 | $v_{DOTCOM}$ | $x_{DOTCOM}$ | 0 |
| EXECUTING SEQUENTIAL TURN & SPEED & ALTITUDE CHANGE | $v_L(t - t_{DELAY}) \pm \Delta v_{TURN}(t - t_{DELAY})$ | $x_L(t - t_{DELAY})$ | $ARCSIN(h_{DOTCOM}/v_{TRACK})$ | $v_{DOTCOM}$ | $x_{DOTCOM}$ | 0 |

A DROP MANEUVER CAN BE COMBINED WITH ANY MANEUVER EXCEPT A TURN. FOR COMBINED MANEUVERS INCLUDING A DROP MANEUVER, $x_{TRACK} = \psi_{WAYPOINT}$ AND EVERYTHING ELSE IN THE TABLE IS THE SAME.

*Fig. 16.*

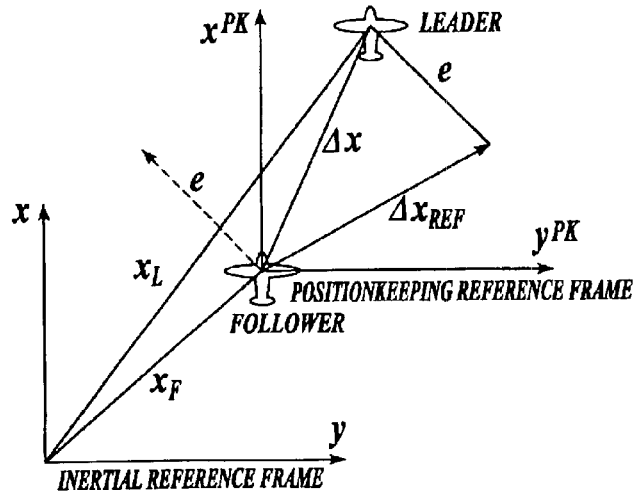

*Fig. 17.*

| QUALITY | LEADER POSITION | FOLLOWER POSITION |
|---|---|---|
| $\Delta x^{PK}, \Delta x_{REF}^{PK}, \Delta x_{NOM}^{PK} > 0$ | AHEAD | BEHIND |
| $\Delta y^{PK}, \Delta y_{REF}^{PK}, \Delta y_{NOM}^{PK} > 0$ | TO THE RIGHT | TO THE LEFT |
| $\Delta z^{PK}, \Delta z_{REF}^{PK}, \Delta z_{NOM}^{PK} > 0$ | BELOW | ABOVE |
| $e_x^{PK} > 0$ | APPEARS TOO FAR AHEAD | IS TOO FAR BEHIND; HAS TO MOVE AHEAD |
| $e_y^{PK} > 0$ | APPEARS TOO FAR RIGHT | IS TOO FAR TO THE LEFT; HAS TO MOVE RIGHT |
| $e_z^{PK} > 0$ | APPEARS TOO FAR BELOW | IS TOO HIGH; HAS TO DESCEND |

*Fig. 18.*

| MANEUVER | $\Delta x^{PK}$ | $\Delta x_{REF}^{PK}$ | CALCULATION $e^{PK}$ | $e_{DISP}^{PK}$ | $\psi_{PK}$ |
|---|---|---|---|---|---|
| POSITIONKEEPING ONLY (NO COMMANDED MANEUVERS); EXECUTING ANY COMBINATION OF SIMULTANEOUS MANEUVERS THAT DO NOT INCLUDE ALTITUDE CHANGES OR TURNS | $x_L^{PK}(t) - x^{PK}(t)$ | $(\Delta x_{NOM}^{PK}\ or\ v^*t_{NOM},\ \Delta y_{NOM}^{PK},\ \Delta z_{NOM}^{PK})$ | $(\Delta x^{PK} - \Delta x_{REF}^{PK},\ \Delta y^{PK} - \Delta y_{REF}^{PK},\ z^{PK} - (-h_{COM}))$ | $\Delta x^{PK} - \Delta x_{REF}^{PK}$ | $\psi_{COM}\ OR\ \chi_{COM}$ |
| EXECUTING SIMULTANEOUS TURN | $x_L^{PK}(t) - x^{PK}(t)$ | $(\Delta x_{NOM}^{PK}\ or\ v^*t_{NOM},\ \Delta y_{NOM}^{PK},\ \Delta z_{NOM}^{PK})$ | $(\Delta x^{PK} - \Delta x_{REF}^{PK},\ \Delta y^{PK} - \Delta y_{REF}^{PK},\ z^{PK} - (-h_{COM}))$ | $\Delta x^{PK} - \Delta x_{REF}^{PK}$ | $\psi_L\ OR\ \chi_L$ |
| EXECUTING ANY COMBINATION OF SIMULTANEOUS MANEUVERS THAT INCLUDE ALTITUDE CHANGES BUT NO TURNS | $x_L^{PK}(t) - x^{PK}(t)$ | $(\Delta x_{NOM}^{PK}\ or\ v^*t_{NOM},\ \Delta y_{NOM}^{PK},\ \Delta z_{NOM}^{PK})$ | $(\Delta x^{PK} - \Delta x_{REF}^{PK},\ \Delta y^{PK} - \Delta y_{REF}^{PK},\ 0)$ | $\Delta x^{PK} - \Delta x_{REF}^{PK}$ | $\psi_{COM}\ OR\ \chi_{COM}$ |
| EXECUTING SIMULTANEOUS TURN AND ALTITUDE CHANGE | $x_L^{PK}(t) - x^{PK}(t)$ | $(\Delta x_{NOM}^{PK}\ or\ v^*t_{NOM},\ \Delta y_{NOM}^{PK},\ \Delta z_{NOM}^{PK})$ | $(\Delta x^{PK} - \Delta x_{REF}^{PK},\ \Delta y^{PK} - \Delta y_{REF}^{PK},\ 0)$ | $\Delta x^{PK} - \Delta x_{REF}^{PK}$ | $\psi_L\ OR\ \chi_L$ |
| ALL PENDING MANEUVERS | $x_L^{PK}(t_{STARTMAN}) - x^{PK}(t)$ | $(v^*(t - t_{STARTMAN}),\ \Delta y_{NOM}^{PK},\ \Delta z_{NOM}^{PK})$ | $(0,\ \Delta y^{PK} - \Delta y_{REF}^{PK},\ z^{PK} - (-h_{COM}))$ | $\Delta x^{PK} - \Delta x_{REF}^{PK}$ | $\psi_{COM}\ OR\ \chi_{COM}$ |

*Fig. 19A.*

| | | | | |
|---|---|---|---|---|
| EXECUTING SEQUENTIAL TURN | $x_L^{PK}(t-t_{DELAY})-x^{PK}(t)$ | $(0, \Delta y_{NOM}^{PK}, \Delta z_{NOM}^{PK})$ | $(\Delta x^{PK}-\Delta x_{REF}^{PK}, \Delta y^{PK}-\Delta y_{REF}^{PK}, 0)$ | $\Delta x^{PK}-\Delta x_{REF}^{PK}$ | $\psi_L(t-t_{DELAY})$ OR $\chi_L(t-t_{DELAY})$ |
| EXECUTING SEQUENTIAL TURN AND ALTITUDE CHANGE | $x_L^{PK}(t-t_{DELAY})-x^{PK}(t)$ | $(0, \Delta y_{NOM}^{PK}, \Delta z_{NOM}^{PK})$ | $(\Delta x^{PK}-\Delta x_{REF}^{PK}, \Delta y^{PK}-\Delta y_{REF}^{PK}, 0)$ | $\Delta x^{PK}-\Delta x_{REF}^{PK}$ | $\psi_L(t-t_{DELAY})$ OR $\chi_L(t-t_{DELAY})$ |
| EXECUTING ANY COMBINATION OF SEQUENTIAL MANEUVERS THAT DO NOT INCLUDE ALTITUDE CHANGES OR TURNS | $x_L^{PK}(t-t_{DELAY})-x^{PK}(t)$ | $(0, \Delta y_{NOM}^{PK}, \Delta z_{NOM}^{PK})$ | $(\Delta x^{PK}-\Delta x_{REF}^{PK}, \Delta y^{PK}-\Delta y_{REF}^{PK}, z^{PK}-(-h_{COM}))$ | $\Delta x^{PK}-\Delta x_{REF}^{PK}$ | $\psi_{COM}$ OR $\chi_{COM}$ |
| EXECUTING ANY COMBINATION OF SEQUENTIAL MANEUVERS THAT DO INCLUDE ALTITUDE CHANGES BUT NO TURNS | $x_L^{PK}(t-t_{DELAY})-x^{PK}(t)$ | $(0, \Delta y_{NOM}^{PK}, \Delta z_{NOM}^{PK})$ | $(\Delta x^{PK}-\Delta x_{REF}^{PK}, \Delta y^{PK}-\Delta y_{REF}^{PK}, 0)$ | $\Delta x^{PK}-\Delta x_{REF}^{PK}$ | $\psi_{COM}$ OR $\chi_{COM}$ |

FOR ANY MANEUVER THAT INCLUDES A DROP MANEUVER, $\chi_{TRACK} = \psi_{WAYPOINT}$

*Fig. 19B.*

| Command |
|---|
| Maneuver time $t_{COM}$ |
| Commanded ground speed $v_{COM}$ or air speed $vtas_{COM}$ |
| Ground speed/air speed flag |
| default acceleration $v_{DOTCOM}$ |
| Commanded track angle $\chi_{COM}$ or heading $\psi_{COM}$ |
| Track angle/heading flag |
| Default bank angle $\mu_{COM}$ |
| Commanded geometric altitude $h_{COM}$ or barometric altitude $hbaro_{COM}$ |
| Geometric altitude/barometric altitude flag |
| Default climb rate $h_{DOTCOM}$ |
| Sequential/simultaneous flag |
| Drop maneuver latitude |
| Drop maneuver longitude |
| Formation geometry flag |

*Fig. 20.*

VEHICLE POSITION KEEPING SYSTEM

TECHNICAL FIELD OF THE INVENTION

The present invention relates to position keeping and, more particularly, to position keeping for vehicles traveling in formation.

BACKGROUND OF THE INVENTION

Vehicles such as C-130 and KC-135 military transport aircraft frequently travel in formation. The C-130 is a medium-range, tactical airlift aircraft designed primarily for transporting personnel and cargo. Although the KC-135 is an aircraft dedicated to air refueling, it also flies command post and reconnaissance missions. However, other aircraft such as the B-52, the B-2, the B-1, the C-17, and the C-141 also fly in formation.

A typical in-trail position keeping formation is illustrated in FIG. 1. The formation consists of multiple three-aircraft cells. The wings follow their cell leader, while each of the cell leaders follows the leader of the cell that immediately precedes it in the formation. Although three cells are illustrated in FIG. 1, formations of thirty cells or more are possible. Also, other types of formations are possible. For example, a box formation is illustrated in FIG. 2, and a fluid trail formation is illustrated in FIG. 3. As shown in FIG. 2, the box formation is formed from two cells of aircraft flying in line-abreast formation. As shown in FIG. 3, in the fluid trail formation, the follower wing aircraft stay along a fixed radius of the leader, never passing forward of the leader, and avoiding the position directly behind the leader.

The spacing between formation members depends on whether the flight is proceeding under visual flight rules (VFR) or under instrument flight rules (IFR), on whether the formation is preparing to land, and on whether other mission parameters are controlling. Some formation geometries are only flown visually.

Also, there are two types of maneuvers that pilots perform during position keeping. The first type is a commanded maneuver involving, for example, speed, heading, and/or altitude changes to the aircraft trajectory as the aircraft performs position keeping missions. A drop command is a commanded maneuver to initiate drops of cargo or personnel. Commanded maneuvers can be either simultaneous or sequential, depending on the type of maneuver and mission requirement. For example, speed changes should always be simultaneous, while altitude changes can be either simultaneous or sequential. Both leader and follower aircraft perform commanded maneuvers.

The second type of maneuver is a position keeping maneuver. Follower aircraft perform position keeping maneuvers in order to maintain a desired relative position to the leader aircraft or other aircraft in the formation. Position keeping maneuvers can be performed alone, or in conjunction with commanded maneuvers. For example, during a commanded turn, the follower attempts to maintain the desired separation with the leader while simultaneously executing the commanded turn maneuver.

A typical formation flight might proceed with the aircraft initially taking off at fixed intervals and climbing to 2000 feet or the lowest altitude to clear the terrain. During this interval, each of the aircraft joins the formation. Following formation, the aircraft then climb at 180 knots to 20,000 feet. The aircraft cruise at 20,000 feet and at 190 knots making speed, heading, and altitude changes as required in order to reach a designated location such as a drop point. If the mission is to drop personnel or cargo, the aircraft typically slow to 125 knots for a personnel drop and 130 knots for a cargo drop and descend simultaneously to the drop altitude, which usually ranges from 700 feet to 1500 feet above the ground depending upon whether the drop is a personnel drop or a cargo drop. The exact altitude is selected based on the highest terrain within five miles of the formation centerline.

The lead aircraft provides its drift angle ten to fifteen minutes from the drop zone so that the follower aircraft can compensate for the difference between heading and track angle. (The drift angle is the angle between the aircraft's heading and the aircraft's actual ground track.) The drift angle is required so that the aircraft can fly the same ground track over the Earth. In order to compensate for drift when flying a ground track rather than a heading, the follower aircraft calculate the lateral offset required to compensate for the drift, and input this offset into the position keeping equipment.

Once the personnel or cargo has been dropped, the follower aircraft reset their lateral offset to the nominal value, all aircraft climb to 20,000 feet, and all aircraft accelerate to 180 knots. During such cruising, speed, heading, and altitude changes may be required during the return to base.

Prior to the final approach fix, the aircraft formation longitudinal spacing is changed to 6000 feet. The aircraft land about 60 seconds apart.

Some of the changes that can occur while the aircraft are en route include rerouting, a change in drop zone, a change in leader, and a change in formation as members leave the formation and others move up.

Current position keeping systems use radar to measure the actual relative positions in the formation and use this relative position measurement to maintain the desired relative positions in the formation. Such systems can be unreliable, expensive, and do not take advantage of data from on-board navigation systems for position keeping. Also, they do not use wind direction in maintaining position in the formation. Therefore, these systems cannot automatically fly a track instead of a heading. Also, current position keeping systems cannot combine some maneuvers, such as altitude changes and turns.

Furthermore, current position keeping systems do not permit lead aircraft to perform formal position keeping maneuvers. Lead aircraft of one cell may informally track the leader of another cell, but they do not receive either formal guidance on their position keeping displays or commanded maneuvers from the other aircraft. The present invention is not so limited and allows lead aircraft in a cell to follow the lead aircraft in another cell.

The present invention overcomes one or more of these or other problems.

SUMMARY OF THE INVENTION

In accordance with one aspect of the present invention, a method of keeping position of a vehicle in a vehicle formation comprises the following: acquiring a track velocity input; acquiring a formation position error input; and, determining a velocity output for the vehicle based on the track velocity input and the formation position error, wherein the velocity output indicates a velocity required to maintain the vehicle in the vehicle formation.

In accordance with another aspect of the present invention, a method of keeping a position of a vehicle in a vehicle formation comprises the following: receiving leader information over a communication link; acquiring relative position information from a relative position measurement system; selecting at least one of the leader information and the relative position information so as to provide selected information; and, determining guidance corrections based on the selected information, wherein the guidance corrections indicate corrections that are required to place the vehicle in the vehicle formation.

In accordance with still another aspect of the present invention, a method of keeping position of a follower in a vehicle formation comprises the following: acquiring a rate of the vehicle; converting the vehicle rate to a directional vehicle rate; acquiring a directional formation position error rate dependent upon an error in the position of the vehicle in the vehicle formation; determining a desired vehicle rate based on the directional vehicle rate and the directional formation position error rate, wherein the desired vehicle rate indicates a rate required to maintain the vehicle in the vehicle formation; converting the desired vehicle rate to a vehicle acceleration input; acquiring a commanded acceleration; and, determining guidance corrections for the vehicle based on the vehicle acceleration input and the commanded acceleration, wherein the guidance corrections indicate guidance corrections required to maintain the vehicle in the vehicle formation and to respond to the commanded acceleration.

In accordance with yet another aspect of the present invention, a method of keeping a position of a vehicle in a vehicle formation comprises the following: receiving a track velocity input comprising $v_{track}$, $\chi_{track}$, and $\gamma_{track}$; receiving a commanded maneuver comprising $v_{dottrack}$, $\chi_{dottrack}$, and $\gamma_{dottrack}$; and, determining guidance corrections based on the track velocity input and the commanded maneuver during position keeping only, during a simultaneous altitude change maneuver, during a simultaneous speed change maneuver, during a simultaneous turn maneuver, during a sequential altitude change maneuver, during a sequential speed change maneuver, during a sequential turn maneuver, during a simultaneous altitude and speed change maneuver, during a simultaneous altitude change and turn maneuver, during a simultaneous turn and speed change maneuver, during a simultaneous turn and altitude and speed change maneuver, during any and all pending maneuvers maneuver, during sequential altitude and speed change maneuvers, during a sequential altitude change and turn maneuver, during a sequential turn and speed change maneuver, and during a sequential turn and altitude and speed change maneuver.

In accordance with a further aspect of the present invention, a method of determining a formation error vector e in a position of a vehicle with respect to a leader L in a vehicle formation comprises the following: determining a position vector $\Delta x$ based upon a position $x_v$ of the vehicle and a position $x_L$ of the leader; comparing the position vector $\Delta x$ to a desired relative position vector $\Delta x_{ref}$, wherein the desired relative position vector $\Delta x_{ref}$ designates a desired relative position between the vehicle and the leader; and, determining the formation error vector e based on a result of the comparison.

In accordance with still a further aspect of the present invention, a method of executing a sequential maneuver by a follower F following a leader L in a vehicle formation comprises the following: once the leader begins execution of the sequential maneuver, waiting to execute the sequential maneuver; during the waiting, guiding the follower to a location occupied by the leader at the time that the leader began the sequential maneuver; and, initiating execution of the sequential maneuver when the follower arrives at the location.

In accordance with yet a further aspect of the present invention, a method of keeping a position of a vehicle in a vehicle formation comprises the following: determining air mass related quantities; determining inertial related quantities; selecting one of the air mass related quantities and the inertial related quantities as selected quantities; and, determining guidance corrections based on the selected quantities.

In accordance with another aspect of the present invention, a method of keeping position of a vehicle in a vehicle formation comprises the following: determining guidance corrections to execute a combined maneuver of the vehicle in the vehicle formation, wherein the combined maneuver comprises a combination of at least two simple maneuvers, and wherein the combined maneuver is commanded by a leader of the vehicle formation; and, guiding the vehicle through the combined maneuver based on the guidance corrections.

In accordance with still another aspect of the present invention, a method of keeping a position of a vehicle in a vehicle formation comprises the following: determining guidance corrections to execute a commanded maneuver of the vehicle in the vehicle formation and to maintain the position of the vehicle in the vehicle formation; and, displaying the guidance corrections on a primary flight display to an operator of the vehicle.

BRIEF DESCRIPTION OF THE DRAWINGS

These and other features and advantages of the present invention will become more apparent from a detailed consideration of the invention when taken in conjunction with the drawings in which:

FIG. 15 summarizes the tracking state and maneuver track rate calculations for simple maneuvers;

FIG. 16 summarizes the tracking state and maneuver track rate calculations for combined maneuvers;

FIG. 17 illustrates vectors $\Delta x$, $\Delta x_{ref}$, and e where e is a formation tracking error vector;

FIG. 18 provides a translation of the components of Δx, $Δx_{ref}$, and e to make their visualization easier;

FIG. 19 illustrates a summary of guidance tracking error calculations;

FIG. 20 illustrates maneuver commands in general form as may be applied in the present invention;

DETAILED DESCRIPTION

Figure 1:
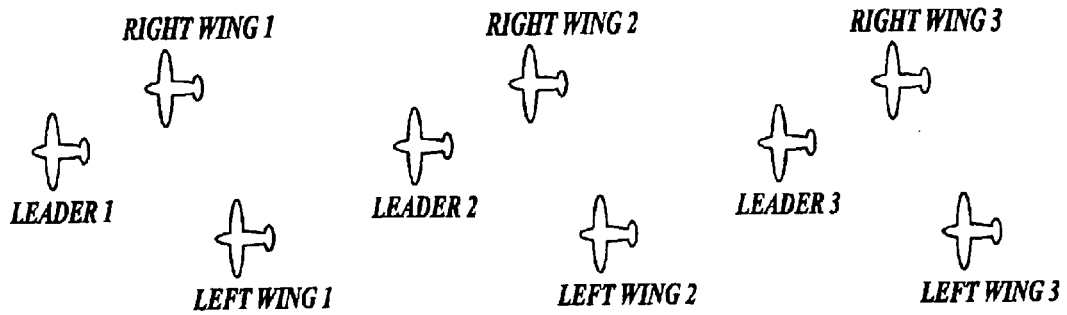
FIG. 1 illustrates a typical in-trail position keeping formation useful in understanding the present invention.
Figure 2:
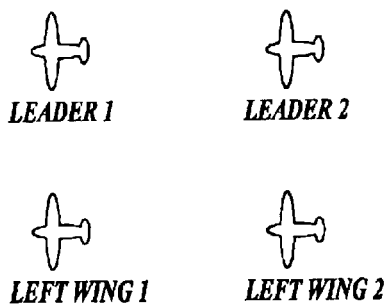
FIG. 2 illustrates a box formation useful in understanding the present invention.
Figure 3:
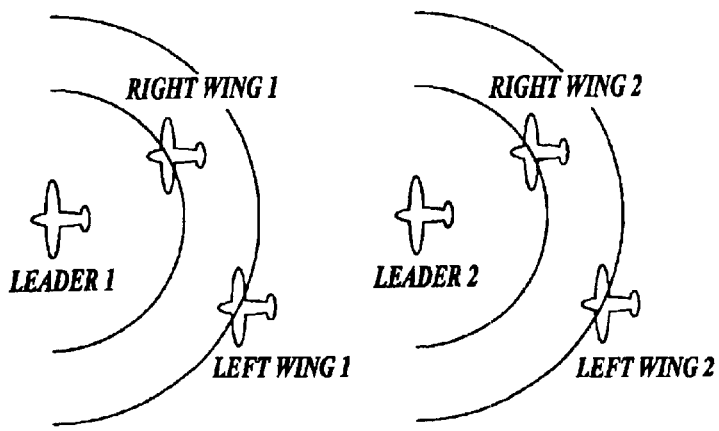
FIG. 3 illustrates a fluid trail formation useful in understanding the present invention.
Figure 4:
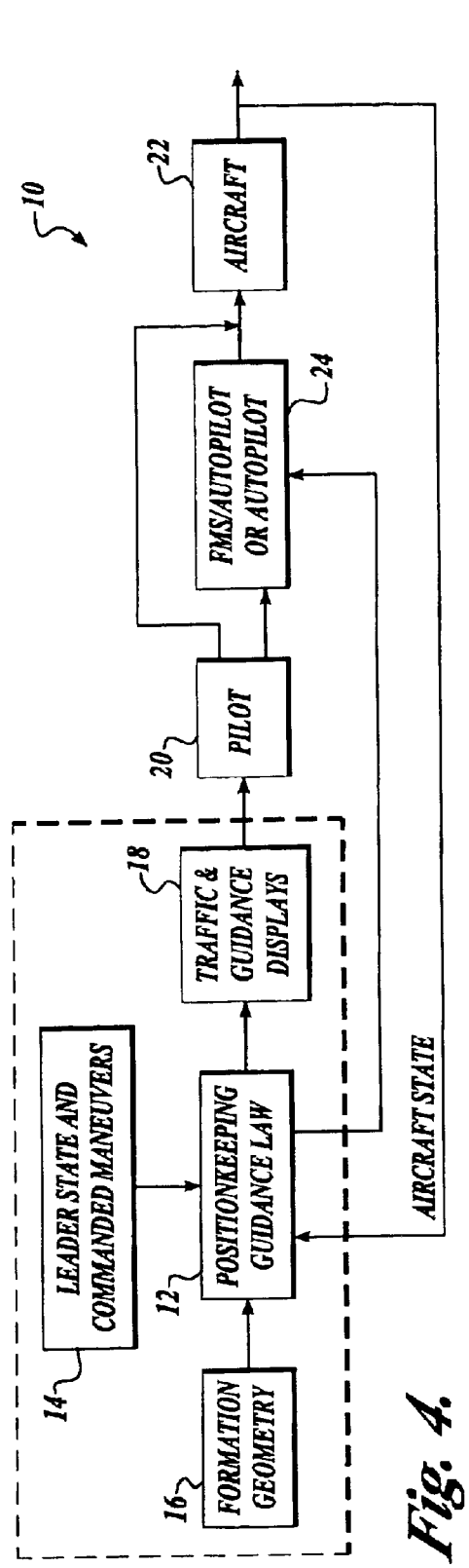
FIG. 4 illustrates an overview of a position keeping guidance system in accordance with an embodiment of the present invention.

Position keeping guidance according to the present invention uses formation geometry, maneuver commands, and/or aircraft states in order to calculate position keeping tracking errors and to provide traffic and guidance to the pilot. A position keeping guidance system 10 in accordance with an embodiment of the present invention is shown in FIG. 4. The position keeping guidance system 10 includes a position keeping guidance law block 12 that calculates the maneuver mode and maneuver commands for an aircraft, that calculates the track velocity and tracking position error of an aircraft, and that computes the position keeping guidance commands for display or for input to a flight management system (FMS) or autopilot of the aircraft.

The position keeping guidance law block 12 accepts leader state and maneuver command inputs from a leader state and maneuver command block 14 and formation geometry from an aircraft state and formation geometry block 16. The formation geometry may be specified by the flight crew, or may be provided via a data link from the lead vehicle, another vehicle, or a ground station. The aircraft state and formation geometry block 16 outputs a selected formation geometry to the position keeping guidance law block 12. The position keeping guidance law block 12 computes various tracking related errors and position keeping guidance instructions, and provides these to a traffic and guidance display block 18 that displays the necessary errors and instructions to a pilot 20 so that the pilot 20 can maintain the aircraft 22 in its correct position within the formation. Alternatively, the output of the position keeping guidance law block 12 can be supplied directly to an FMS or automatic pilot 24 so that adjustments can be made automatically to maintain the aircraft 22 in its correct formation position.

Figure 5:
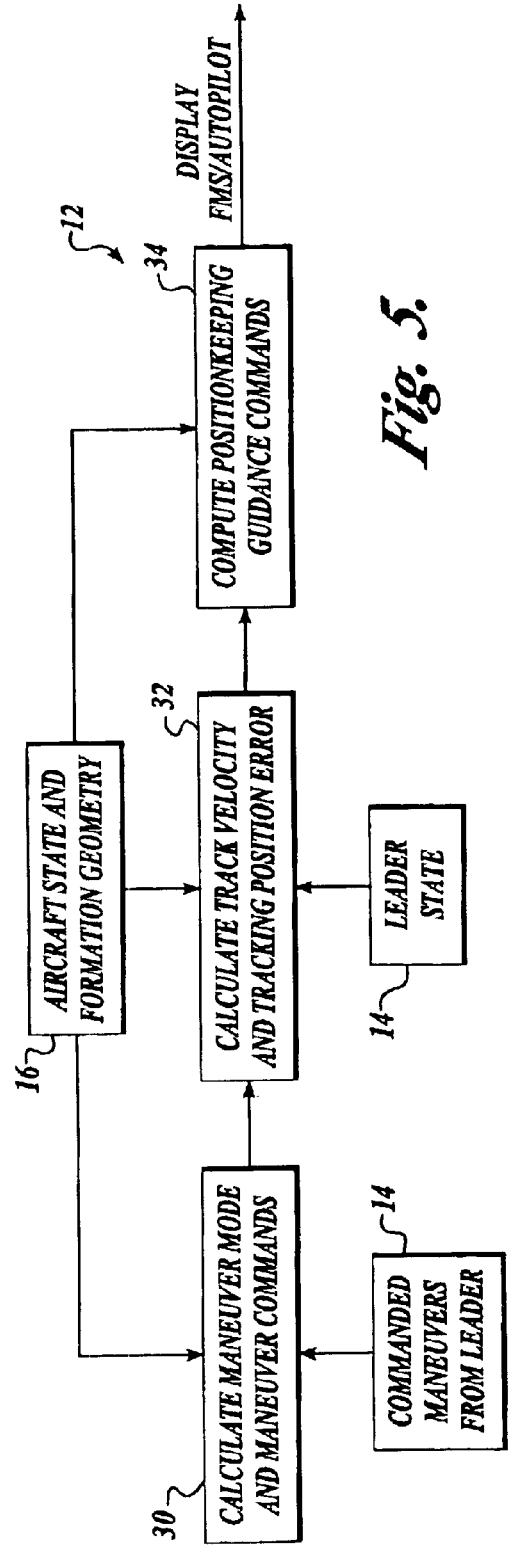
FIG. 5 illustrates the position keeping guidance law block of FIG. 4 in greater detail.

FIG. 5 illustrates the position keeping guidance law block 12 of FIG. 4 in additional detail. The position keeping guidance law block 12 includes a maneuver mode and maneuver command calculation block 30, a track velocity and tracking position error calculation block 32, and a position keeping guidance command calculation block 34 each of which receives aircraft state and formation geometry information from the aircraft state and formation geometry block 16. In addition, the maneuver mode and maneuver command calculation block 30 receives the maneuvers commanded by the leader from the leader state and maneuver command block 14, and the track velocity and tracking position error calculation block 32 receives the leader state information from the leader state and maneuver command block 14. The position keeping guidance command calculation block 34 supplies the tracking related errors and position keeping guidance instructions to the traffic and guidance display block 18 and/or to the FMS or automatic pilot 24.

Whether the formation aircraft are or are not performing commanded maneuvers, they are maintaining a formation geometry. Typically, the follower aircraft are responsible for monitoring their positions relative to the leader aircraft and for making the necessary guidance adjustments, which can be done visually or with the aid of a traffic or guidance display. Usually, speed v is used to compensate for longitudinal errors, bank angle $\mu$ is used to compensate for lateral errors, and flight path angle $\gamma$ is used to compensate for vertical errors.

Commanded maneuvers generally fall into two categories—simultaneous maneuvers and sequential maneuvers. Simultaneous commanded maneuvers are maneuvers where the leader and follower initiate the maneuver at the same time. For example, speed, heading, and altitude changes may be made simultaneously.

During a commanded simultaneous speed change, the shape of the formation should not change. Each pilot is required to adjust the throttle and angle of attack or to input a speed command in order to track the new commanded speed. Each follower pilot is responsible for monitoring the lateral and longitudinal tracking errors with respect to the leader and monitoring altitude to ensure that the formation geometry remains constant.

Figure 6A:
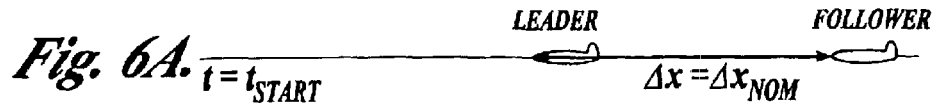
FIG. 6 illustrates a simultaneous commanded altitude change maneuver useful in understanding the present invention.
Figure 6B:
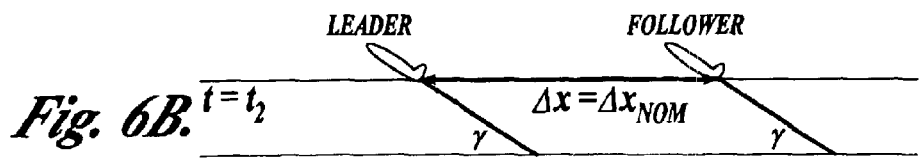
Figure 6C:
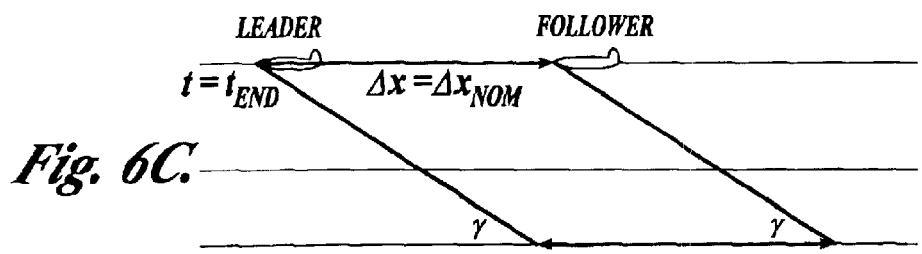

A simultaneous commanded altitude change maneuver is illustrated in FIG. 6. The leader and follower aircraft initiate the altitude change at the same time, tracking to a predetermined climb or descent rate. In addition to tracking the climb or descent rate, the follower aircraft adjust their speeds and bank angles to maintain the longitudinal and lateral formation separations.

Simultaneous commanded turns typically have not in the past been performed by military transport aircraft because it is more difficult to maintain the formation geometry during a simultaneous turn. These aircraft have instead performed commanded turns sequentially. However, to perform a commanded turn simultaneously, the leader aircraft turns to a predetermined bank angle and the follower aircraft maintain their longitudinal positions by speeding up or slowing down depending on whether the follower aircraft are on the outside or inside of the turn. Bank angles may be used to perform the turn and to compensate for any lateral position errors. Both the leader and the follower aircraft also track to the appropriate altitude.

Combined simultaneous commanded maneuvers can also be performed.

Sequential commanded maneuvers are maneuvers that the follower aircraft perform after the leader aircraft. The leader initiates the commanded sequential maneuver, and the follower aircraft wait a predetermined amount of time so that they can initiate the same commanded maneuver at the same longitudinal location where the leader aircraft initiated that same maneuver. A commanded maneuver of a follower is pending from the time that the leader initiates the sequential commanded maneuver until the follower reaches the location at which the leader initiated the sequential commanded maneuver.

Figure 7A:
FIGS. 7 and 8 illustrate a commanded sequential altitude change.
Figure 7B:
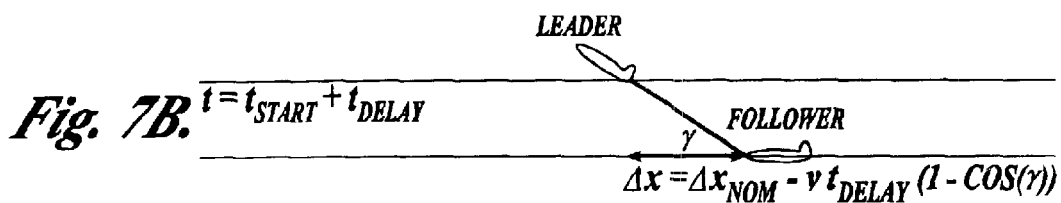
Figure 7C:
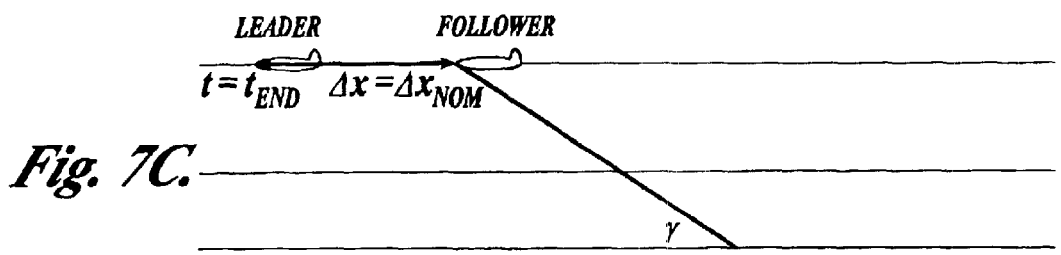

A commanded sequential altitude change is illustrated in FIG. 7. At the location where leader initiates an altitude change (i.e., $t=t_{start}$), the follower is following by some delay time $t_{delay}$ behind the leader. The follower tracks its speed so that it initiates the altitude change after the delay time has elapsed so that the follower is at the same longitudinal location as the leader when the leader started its altitude change.

During a sequential commanded maneuver, the formation geometry changes. Using an altitude change as an example, when the leader is climbing and the follower maneuver is pending (i.e., the delay time $t_{delay}$ has not completely elapsed), it appears to the follower that the leader is getting closer longitudinally. That is, because the longitudinal component of speed decreases during the climb, the leader and follower are flying to different longitudinal components of speed. However, once the leader has completed the climb maneuver, the longitudinal relative position increases again because the follower is into its climb.

The leader climbs while tracking to a predetermined climb rate. Once the follower initiates its climb, it tracks to the same predetermined climb rate. The follower has the additional task of maintaining the appropriate longitudinal and lateral separation. The lateral separation is tracked as for a simultaneous altitude change, and errors are compensated for with bank angle corrections.

Figure 8:
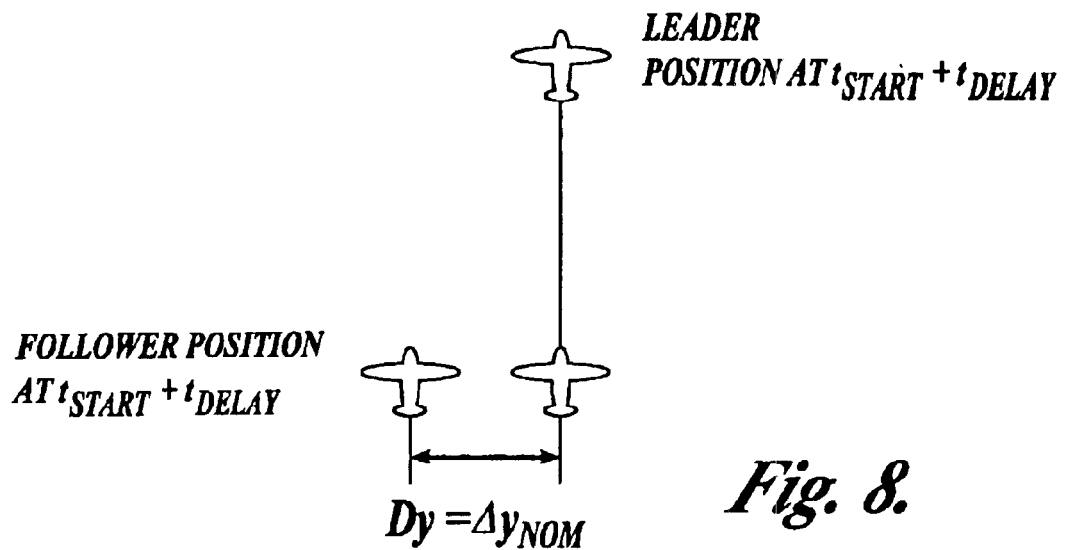

The longitudinal separation cannot be tracked as for a simultaneous altitude change. As mentioned previously, the longitudinal separation changes as the leader and follower maneuvers progress. Instead of tracking to the current position of the leader, the follower can track to the delayed or ghost position of the leader, as illustrated in FIG. 8. The ghost leader is next to the follower so that, when tracking the ghost position of the leader, the follower keeps the longitudinal relative position to zero.

Figure 9A:
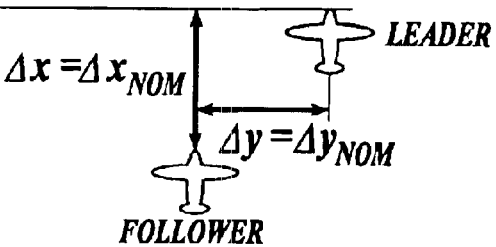
FIGS. 9 and 10 illustrate a commanded sequential turn.
Figure 9B:
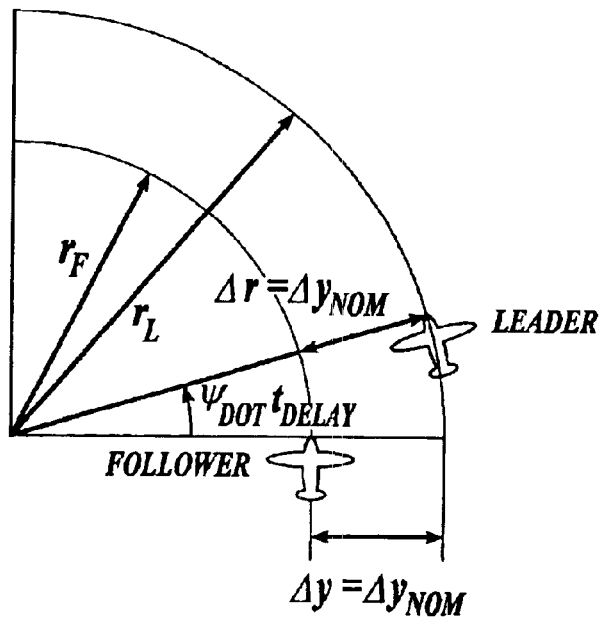
Figure 9C:
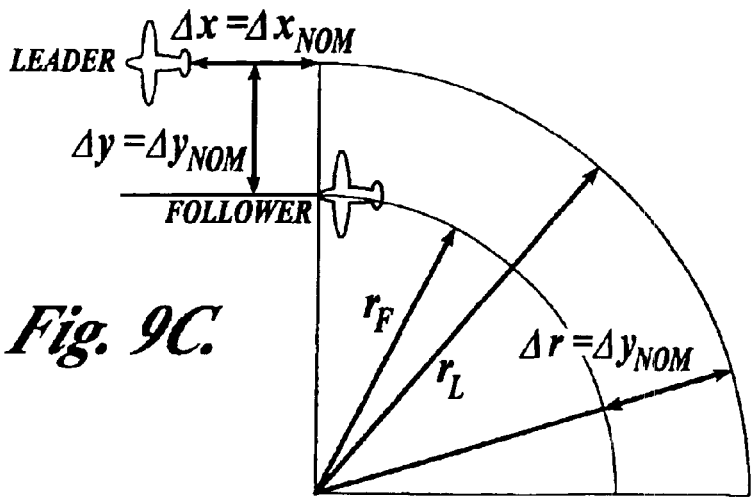

A commanded sequential turn maneuver is performed as follows. The leader initiates its turn by banking to a predetermined bank angle until the desired heading or track angle is reached. The follower waits a delay time $t_{delay}$ to start the turn maneuver at the same longitudinal location that the leader was in when the leader started its turn maneuver. The goal during the sequential turn is for the leader and follower aircraft to follow concentric arcs, as shown in FIG. 9. The follower banks to a bank angle that is smaller (or larger) than the predetermined bank angle that the leader uses in order to compensate for being on the inside (or outside) of the turn. The follower also decreases (or increases) speed to compensate for being on the inside (or outside) of the turn.

Figure 10:
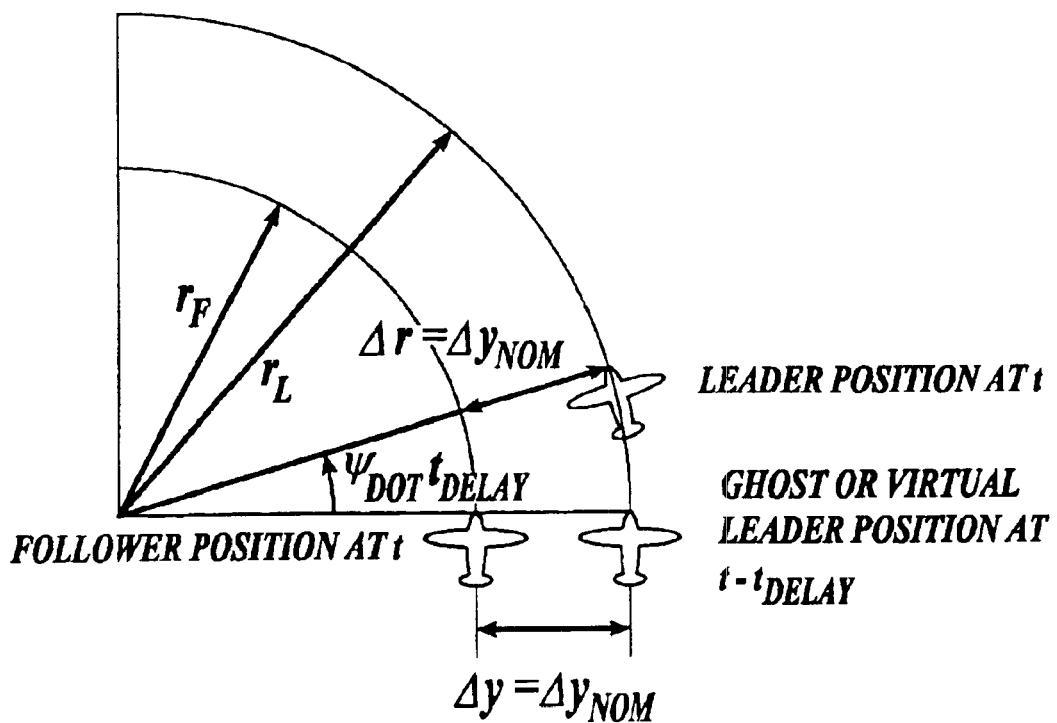

As in the case of a sequential altitude change, it is convenient for the follower to track the ghost position of the leader as shown in FIG. 10. The lateral position with respect to the ghost position of the leader matches the formation lateral separation. The longitudinal relative position is zero; that is, the ghost leader is next to the follower.

Sequential commanded speed changes typically are not performed by military transport aircraft because, if speed changes are not performed simultaneously, there will be a change in the longitudinal relative position of the leader and follower. Thus, if the leader and follower perform a sequential speed change, the follower has to accelerate or decelerate for some time after the maneuver is complete in order to compensate for the period of time that the leader and follower have a difference in speed.

Usually, the longitudinal separation between the leader and follower is specified as a separation distance. However, the longitudinal separation between the leader and follower could also be specified in terms of a separation time $\Delta t_{nom}$. During nominal position keeping and simultaneous maneuvers, $\Delta t_{nom}$ can be converted to an equivalent separation distance by multiplying it by the follower's commanded speed. During sequential maneuvers, the delay time $t_{delay}$ is the same as $\Delta t_{nom}$.

The position keeping guidance law block 12 calculates guidance commands for display to the pilot based on formation tracking position error and track velocity. The guidance commands can also be automatically provided to the flight management system (FMS) or autopilot. The purpose of the position keeping guidance system 10 is to provide guidance so that the pilot can perform mission maneuvers while maintaining the desired formation geometry. The calculation of the position keeping guidance commands according to one aspect of the present invention uses a technique called dynamic inversion.

Figure 11:
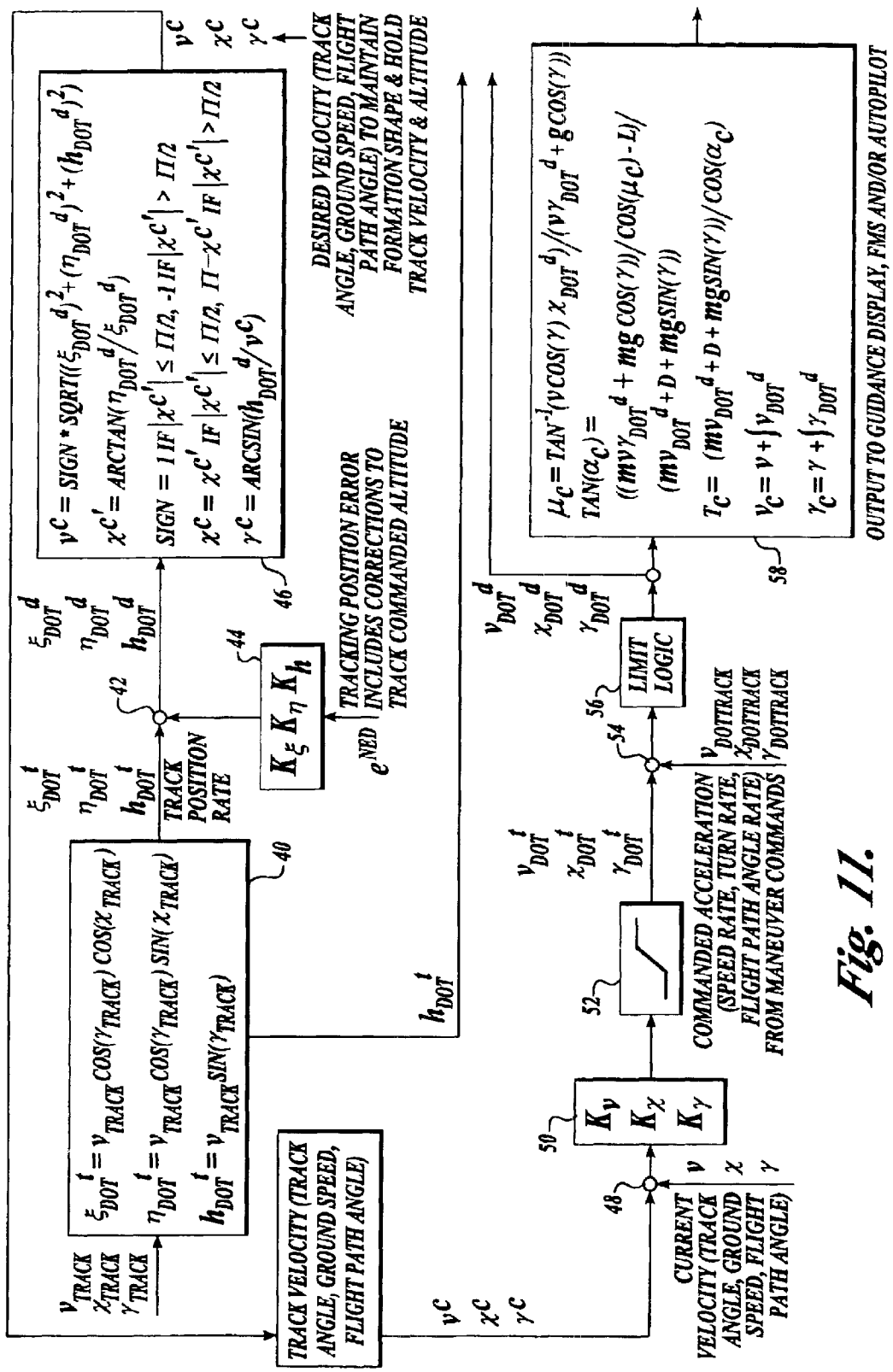
FIG. 11 is a block diagram illustrating the position guidance law calculations performed by the position keeping guidance law block of FIGS. 4 and 5.

FIG. 11 is a block diagram illustrating the position guidance law calculations performed by the position keeping guidance law block 12. The primary input is the track velocity comprising the ground speed $v_{track}$, the track angle $\chi_{track}$, the flight path angle $\gamma_{track}$, and the formation guidance tracking position error $e^{NED}$. NED designates a North, East, and down reference frame. As will be understood from the description below (e.g., see FIG. 15), the track velocity is dependent upon information supplied by or about the leader and any maneuver commands. This information may be supplied over a communication link from the leader, from another aircraft, or from a ground station, and/or by an on-board relative position determining system such as radar, TCAS, etc.

The formation tracking position error $e^{NED}$ is calculated using the relative position between the leader and follower, the formation geometry, and the commanded altitude. The relative position between the leader and follower can be provided by a relative position determining device or calculated using the leader position and follower position, or calculated using a combination of the two.

When the leader information is provided over a communication link, the source of the information is usually the on-board navigation system, which could be an inertial navigation system (INS), a global positioning system (GPS)-based navigation system, or a combined GPS/INS or other system. The navigation data could be augmented by other on-board system data, such as air data, as needed. The leader data could be linked directly to the followers, be linked via other aircraft, or be linked through a ground station.

Although the guidance command calculations use ground speed $v_{track}$, track angle $\chi_{track}$, and geometric altitude h, the commanded maneuvers can be specified in terms of either air speed or ground speed, either heading or track angle, and/or either geometric or barometric altitude, and converted as needed.

The ground speed $v_{track}$, the track angle $\chi_{track}$, and the flight path angle $\gamma_{track}$ are used by a block 40 to calculate a North position rate $\xi_{dot}^t$, an East position rate $\eta_{dot}^t$, and a vertical position rate $h_{dot}^t$ according to the following equations:

$$\xi_{dot}^t = v_{track} \cos(\gamma_{track})\cos(\chi_{track}) \quad (1)$$

$$\eta_{dot}^t = v_{track} \cos(\gamma_{track})\sin(\chi_{track}) \quad (2)$$

$$h_{dot}^t = v_{track} \sin(\gamma_{track}) \quad (3)$$

An adder 42 adds the North position rate $\xi_{dot}^t$, the East position rate $\eta_{dot}^t$, and the vertical position rate $h_{dot}^t$ to a North tracking error rate $K_\xi e_\xi$, an East tracking error rate $K_\eta e_\eta$, and a vertical tracking error rate $K_h e_h$, respectively, according to the following equations:

$$\xi_{dot}^d = \xi_{dot}^t + K_\xi e_\xi \quad (4)$$

$$\eta_{dot}^d = \eta_{dot}^t + K_\eta e_\eta \quad (5)$$

$$h_{dot}^d = h_{dot}^t + K_h e_h \quad (6)$$

in order to calculate a combined position error rate ($\xi_{dot}^d$, $\eta_{dot}^d$, $h_{dot}^d$) that balances the goal of following the desired track angle, ground speed, and geometric altitude and the goal of maintaining the formation geometry. The North tracking error rate $K_\xi$ $e_\xi$, the East tracking error rate $K_\eta$ $e_\eta$, and the vertical tracking error rate $K_h$ $e_h$ are supplied by a gain block 44 based on the formation tracking error $e^{NED}$. (The gains $K_\xi$, $K_\eta$, and $K_h$, for example, may be 0.25 rad/s, 0.25 rad/s, and 0.125 rad/s, respectively.) The formation errors $e_\xi$, $e_\eta$, and $e_h$ are the North, East, and down components of $e^{NED}$.

The position error rates $\xi_{dot}^d$, $\eta_{dot}^d$, and $h_{dot}^d$ are input into the inverted dynamic equations implemented by a block 46 in order to calculate the ground speed $v^c$, track angle $\chi^c$, and flight path angle $\gamma^c$ that are required to follow the desired ground speed, track angle, and geometric altitude while at the same time maintaining the formation geometry. Accordingly, the block 46 implements dynamic inversion by calculating the ground speed $v^c$, track angle $\chi^c$, and flight path angle $\gamma^c$ according to the following equations:

$$v^c = \text{sign} \sqrt{(\xi_{dot}^d)^2 + (\eta_{dot}^d)^2 + (h_{dot}^d)^2} \tag{7}$$

$$\text{sign} = 1 \text{ if } |X^{c'}| \leq \pi/2 \tag{8}$$
$$= -1 \text{ if } |X^{c'}| > \pi/2$$

$$\chi^{c'} = \tan^{-1}(\eta_{dot}^d / \xi_{dot}^d) \tag{9}$$

$$X^c = X^{c'} \text{ if } |X^{c'}| \leq \pi/2 \tag{10}$$
$$= \pi - X^{c'} \text{ if } |X^{c'}| > \pi/2$$

$$\gamma^c = \sin^{-1}(h_{dot}^d / v^c) \tag{11}$$

The quadrant checks in equations (8) and (10) are necessary to prevent the aircraft from turning in order to slow down. In general, the aircraft should use speed only if it is too close longitudinally; it should not use bank angle or a combination of speed and bank angle if it is too close longitudinally. The ground speed $v^c$, the track angle $\chi^c$, and the flight path angle $\gamma^c$ represent the state that the aircraft should be following in order to simultaneously maintain the formation shape and follow the track velocity.

A summer 48 subtracts the current ground speed v, the current track angle $\chi$, and the current flight path angle $\gamma$ from the required states $v^c$, $\chi^c$, and $\gamma^c$ calculated by the block 46. The current ground speed v, the current track angle $\chi$, and the current flight path angle $\gamma$ are provided by the on-board navigation system. Gains $K_v$, $K_\chi$, and $K_\gamma$ are applied by a gain block 50 to the results of these subtractions and are limited by a limiter 52 in order to produce a ground speed rate $v_{dot}^t$, a track rate $\chi_{dot}^t$, and a flight path angle rate $\gamma_{dot}^t$ according to the following equations:

$$v_{dot}^t = K_v(v^c - v) \tag{12}$$

$$\chi_{dot}^t = K_\chi(\chi^c - \chi) \tag{13}$$

$$\gamma_{dot}^t = K_\gamma(\gamma^c - \gamma) \tag{14}$$

$K_v$, $K_{102}$, and $K_\gamma$ may have values, for example, of 0.5 rad/s, 0.25 rad/s, and 0.5 rad/s, respectively. If the current ground speed v, the current track angle X, and the current flight path angle $\gamma$ are the same as the required states $v^c$, $\chi^c$, and $\gamma^c$, then $V_{dot}^t$, $\chi_{dot}^t$, and $\gamma_{dot}^t$ will be zero.

The speed rate $v_{dot}^t$, the heading or track rate $\chi_{dot}^t$, and the flight path angle rate $\gamma_{dot}^t$ are added to the commanded maneuver speed rate $V_{dottrack}$, the commanded maneuver track rate $\chi_{dottrack}$, and the commanded maneuver flight path angle rate $\gamma_{dottrack}$ by an adder 54 according to the following equations:

$$v_{dot}^d = v_{dot}^t + v_{dottrack} \tag{15}$$

$$\chi_{dot}^d = \chi_{dot}^t + \chi_{dottrack} \tag{16}$$

$$\gamma_{dot}^d = \gamma_{dot}^t + \gamma_{dottrack} \tag{17}$$

The commanded maneuver speed rate $v_{dottrack}$, the commanded maneuver heading or track rate $\chi_{dottrack}$, and the commanded maneuver flight path angle rate $\gamma_{dottrack}$ comprise commanded maneuver accelerations, which may be supplied by the leader over a communication link to its followers, and are zero during nominal position keeping but can be nonzero if a commanded maneuver, such as a speed change, a turn, or an altitude change, is commanded. Thus, if the aircraft is to execute a commanded speed change, for example, the acceleration $v_{dottrack}$ is commanded before any errors in the formation geometry (which will appear through the formation tracking error $e^{NED}$) or errors in tracking the track angle, ground speed, or flight path angle (which will appear through $\xi_{dot}^t$, $dot^t$ and/or $h_{dot}^t$) are seen. Using this feedforward information improves tracking performance, although the guidance laws implemented by the position keeping guidance law block 12 will work without it.

Before the commanded accelerations $v_{dot}^d$, $\chi_{dot}^d$, and $\gamma_{dot}^d$ are passed to the autopilot or are used to calculate display outputs, they are limited by a limiter 56. The limits on the commanded accelerations could be constants or they could be calculated using a dynamic model for the aircraft. When using a dynamic model for the aircraft, the limits on the commanded accelerations $v_{dot}^d$, $\chi_{dot}^d$, and $\gamma_{dot}^d$ are calculated using a model of the autopilot and expected performance limits on the bank angle $\mu$, the thrust T, and the angle of attack $\alpha$. The aircraft equations of motion are given by the following equations:

$$mv_{dot} = -D + T\cos(\alpha) - mg\sin(\gamma) \tag{18}$$

$$mv\cos(\gamma)\chi_{dot} = (L + T\sin(\alpha))\sin(\mu) \tag{19}$$

$$mv\gamma_{dot} = (L + T\sin(\alpha))\cos(\mu) - mg\cos(\gamma) \tag{20}$$

where D is drag, T is thrust, m is mass, g is gravity, and L is lift. The autopilot model is determined by dynamically inverting the equations of motion to solve for the controls $\mu_c$, $T_c$, and $\alpha_c$ and is given by the following equations:

$$\mu_c = \tan^{-1}(v\cos(\gamma)\chi_{dot}^d)/(v\gamma_{dot}^d + g\cos(\gamma)) \tag{21}$$

$$T_c = (mv_{dot}^d + D + mg\sin(\gamma))/\cos(\alpha_c) \tag{22}$$

$$\tan(\alpha_c) = ((mv\gamma_{dot}^d + mg\cos(\gamma))/\cos(\mu_c) - L)/(mv_{dot}^d + D + mg\sin(\gamma)) \tag{23}$$

L and D are modeled according to the following equations:

$$L = qSC_L \tag{24}$$

$$D = qSC_D \tag{25}$$

$$C_L = C_{L\alpha 0} + C_{L\alpha}\alpha \tag{26}$$

$$C_D = C_{Dmin} + KC_L^2 \tag{27}$$

where q is dynamic pressure available from an air data system, S is surface area of the wing, $C_L$ is the coefficient of lift, $C_D$ is the coefficient of drag, $C_{L\alpha 0}$ is the lift curve y intercept, $C_{L\alpha}$ is the lift curve slope, $C_{Dmin}$ is the drag polar minimum, and K is the drag polar coefficient. Let it be assumed that the performance limits on the bank angle $\mu$ are $\mu_{min-limit}$ and $\mu_{max-limit}$, that the performance limits on the thrust T are $T_{min-limit}$ and $T_{max-limit}$, and that the performance limits on the angle of attack α are $\alpha_{min-limit}$ and $\alpha_{max-limit}$. Let it further be assumed that the unlimited rates are denoted $v_{dot}^{d'}$, $\chi_{dot}^{d'}$, and $\gamma_{dot}^{d'}$.

First, the unlimited track angle rate $\chi_{dot}^{d'}$ is limited as follows. $\mu_c$ is calculated from equation (21) using the unlimited track angle rate $\chi_{dot}^{d'}$ and the unlimited flight angle path rate $\gamma_{dot}^{d'}$ according to the following equation:

$$\mu_c' = \tan^{-1}(v \cos(\gamma) \chi_{dot}^{d'})/(v\gamma_{dot}^{d'} + g \cos(\gamma)) \quad (28)$$

If $\mu_c'$ is inside the bank angle limits of $\mu_{min-limit}$ and $\mu_{max-limit}$, then the limited track angle rate $\chi_{dot}^{d}$ is given by the following equation:

$$X_{dot}^{d} = X_{dot}^{d'} \quad (29)$$

If $\mu_c$ is outside the bank angle limits of $\mu_{min-limit}$ and $\mu_{max-limit}$, it may be assumed that the bank angle limit is exceeded due to an excessive desired track angle rate (i.e., turn rate) $X_{dot}^{d}$ rather than to an excessive climb rate $\gamma_{dot}^{d}$. The turn rate $X_{dot}^{d}$ is calculated by rearranging equation (21) and by substituting $\mu_{lim}$ for $\mu$ according to the following equation:

$$\chi\text{dot}^d = (\tan(\mu_{lim})(v\gamma_{dot}^{d'} + g\cos(\gamma)))/(v \cos(\gamma)) \quad (30)$$

where $$\mu_{lim} = \mu_{min-limit} \text{ if } \mu_c' < \mu_{min-limit} \quad (31)$$
$$= \mu_{max-limit} \text{ if } \mu_c' > \mu_{max-limit}$$

Second, the unlimited acceleration $v_{dot}^{d'}$ and the unlimited climb rate $\gamma_{dot}^{d'}$ are limited as follows. $\mu_c$ is calculated using equation (21) with $\chi_{dot}^{d}$ as given above according to the following equation:

$$\mu_{c-tan}^{-1}(v \cos(\gamma)\chi_{dot}^{d})/(v\ \gamma_{dot}^{d'} + g \cos(\gamma)) \quad (32)$$

Next $T_c'$ and $\alpha_c'$ are calculated using equations (22) and (23) and $\mu_c$ and by substituting $v_{dot}^{d'}$ and $\gamma_{dot}^{d'}$ for $V_{dot}^{d}$ and $\gamma_{dot}^{d}$.

There are four situations (A, B, C, and D) to consider. In situation A, if $T_c'$ as so calculated is within the thrust limits $T_{min-limit}$ and $T_{max-limit}$, then the limited acceleration $v_{dot}^{d}$ is given by the following equation:

$$v_{dot}^{d} = v_{dot}^{d'} \quad (33)$$

In situation B, if $T_c'$ as calculated above is outside the thrust limits $T_{min-limit}$ and $T_{max-limit}$, it may be assumed that this situation has been caused by a command for an excessive acceleration $v_{dot}^{d'}$. Using the approximation that the angle of attack a is a small angle, equation (20) can be solved for $\alpha_c$ by substituting $Y_{dot}^{d'}$ for $Y_{dot}^{d}$ and $T_{lim}$ for T to produce the following equation:

$$\alpha_c' = ((mv\gamma_{dot}^{d'} + mg \cos(\gamma))/\cos(\mu_c) - C_{L\alpha 0}qS)/(C_{L\alpha}qS + T_{lim}) \quad (34)$$

Equation (18) can be solved for the limited acceleration $v_{dot}^{d}$ using equations (25), (26), and (27), where ac is substituted for α and $T_{lim}$ is used for T to produce the following equation:

$$v_{dot}^{d} = (-D + T_{lim} \cos(\alpha_c') - mg \sin(\gamma))/m \quad (35)$$

where $$C_L = C_{L\alpha 0} + C_{L\alpha}\alpha_c' \quad (36)$$

$$T_{lim} = T_{min-limit} \text{ if } T_c' < T_{min-limit} \quad (37)$$
$$= T_{max-limit} \text{ if } T_c' > T_{max-limit}$$

In situation C, if $\alpha_c'$ is within the angle of attack limits $\alpha_{min-limit}$ and $\alpha_{max-limit}$, then the limited climb rate $\gamma_{dot}^{d}$ is given by the following equation:

$$\gamma_{dot}^{d} = \gamma_{dot}^{d'} \quad (38)$$

In situation D, if $\alpha_c'$ is outside the angle of attack limits $\alpha_{min-limit}$ and $\alpha_{max-limit}$, it may be assumed that acceleration has already been limited, if necessary, and that this situation is caused by a command for an excessive climb rate $\gamma_{dot}^{d'}$. The limited climb rate $\gamma_{dot}^{d}$ can be calculated by rearranging equation (23) and by using equations (25), (26), and (27) to produce the following equation:

$$\gamma_{dot}^{d} = (((mv_{dot}^{d} + D + mg \sin(\gamma))\tan(\alpha_{lim}) + L)\cos(\mu_c) - mg \cos(\gamma))/(m \quad (39)$$

where $$C_L = C_{L\alpha 0} + C_{L\alpha}\alpha_{lim} \quad (40)$$

$$\alpha_{lim} = \alpha_{min-limit} \text{ if } \alpha_c' < \alpha_{min-limit} \quad (41)$$
$$= \alpha_{max-limit} \text{ if } \alpha_c' > \alpha_{max-limit}$$

An exemplary set of performance limits and other values for the C-130 may be given as follows: the bank angle limits are $\mu_{max-limit}=45°$, $\mu_{min-limit}=45°$; the angle of attack limits are $\alpha_{min-limit}=-7°$, $\alpha_{max-limit}=20°$; the thrust limits are $T_{min-limit}=0$, $T_{max-limit}=66000$ lbf; the wing surface S is 1745 ft²; the lift curve y intercept $C_{L\alpha 0}$ is 0.3; the lift curve slope $C_{L\alpha}$ is 4.5 per radian; the drag polar minimum $C_{Dmin}$ is 0.025; and the drag polar coefficient K is 0.04. As discussed above, dynamic pressure q is provided by the air data computer. The mass m is determined as W/g, where W is a default weight of the aircraft.

The commanded accelerations $v_{dot}^{d}$, $\chi_{dot}^{d}$, and $\gamma_{dot}^{d}$ represent the corrections that are necessary to maintain formation and track state and to implement any commanded maneuver. The commanded accelerations $v_{dot}^{d}$, $\chi_{dot}^{d}$, and $\gamma_{dot}^{d}$ as limited by the limiter 54, and the vertical position rate $h_{dot}^{t}$ from the block 40, are passed to the guidance display 18 or they may be passed to the autopilot 24 for automatic corrections. The commanded accelerations $v_{dot}^{d}$, $\chi_{dot}^{d}$, and $\gamma_{dot}^{d}$ as limited by the limiter 54 are also supplied to a block 58 for calculation of other display outputs. For example, a commanded speed guidance $v_c$ and a commanded flight path angle guidance $\gamma_c$ are calculated by integrating $v_{dot}^{d}$ and $\gamma_{dot}^{d}$ according to the following equations:

$$v_c = v + \int v_{dot}^{d} \quad (42)$$

$$\gamma_c = \gamma + \int \gamma_{dot}^{d} \quad (43)$$

Also, as shown in the block 58 of FIG. 11, commanded bank angle guidance $\mu_c$, thrust $T_c$, and angle of attack $\alpha_c$ are calculated according to equations (21), (22), and (23). The commanded accelerations $v_{dot}^{d}$, $\chi_{dot}^{d}$, and $\gamma_{dot}^{d}$, the bank angle guidance $\mu_c$, the thrust guidance $T_c$, the angle of attack guidance $\alpha_c$, the ground speed guidance $v_c$, and the flight path angle guidance $\gamma_c$ (FIG. 11) can be combined with the maneuver commands (the commanded track angle $\chi_{com}$ or the commanded heading $\Psi_{com}$, the commanded ground speed $v_{com}$ or the commanded air speed $vas_{com}$, and the commanded geometric altitude $h_{com}$ or the barometric altitude $hbaro_{com}$), the lateral, longitudinal and vertical deviations from the leader position or commanded altitude $e_{disp}$, the track climb rate $h_{dot}{}^t$, and other information in order to provide guidance to the pilot, the flight management system, or the autopilot. The calculation of the displayed tracking error command $e_{disp}$ is described below. Immediately below is a description of how the display outputs can be used to fly position keeping missions.

There are a number of possible outputs from the position keeping guidance law block 12. These outputs may be used in different ways, depending on how the position keeping mission and maneuvers are flown. In general, a pilot has three options when flying, which are referred to herein as flight modes. First, in the manual flight director mode, the pilot flies manually using guidance cues to track the desired speed, heading, and altitude while also maintaining the formation shape. Second, in the autopilot select mode, speed, heading, or altitude are provided to the autopilot or autothrottle which controls the speed of the aircraft automatically. Third, in the autopilot coupled mode, all flight commands are automatically provided to the autopilot and autothrottle either directly or through the FMS.

Each of these flight modes can be used for any combination of the turn, speed change, and altitude change maneuvers. How each maneuver will be flown depends on the equipment of the aircraft, flight crew preferences, and aircraft role. For example, an aircraft that does not have an autothrottle cannot command speed in the autocoupled flight mode. Similarly, an aircraft in the leader role may be flying the maneuvers using the autocoupled flight mode while a follower tracks using the flight director. Currently, most position keeping maneuvers are flown manually.

The position keeping guidance display can be used for both manual flight and to provide the necessary values for the autopilot during autopilot select flight. It may also be useful during autocoupled flight to maintain situational awareness.

To manually control longitudinal position and speed, the guidance display(s) can include one or more of the following: the longitudinal formation tracking error component of $e_{disp}$, the ground speed guidance $v_c$, and the acceleration guidance $v_{dot}{}^d$. For manual lateral guidance, the guidance display(s) can include one or more of the following: the lateral formation tracking error component of $e_{disp}$, the bank angle guidance $\mu_c$, and the commanded track angle $\chi_{com}$ or commanded heading $\Psi_{com}$. For manual vertical guidance, the guidance display(s) can include one or more of the following: the commanded altitude $h_{com}$, the target climb rate $h_{dot}{}^t$, and the flight path angle guidance $\gamma_c$. Which variables will be displayed depends on pilot preferences and display limitations. If desired, the inertial quantities can be converted to air mass referenced quantities. For example, the ground speed guidance $v_c$ can be converted to an air speed guidance.

In the autopilot select flight mode, the pilot flies by providing commands to the autopilot and/or autothrottle. For longitudinal/speed guidance, the pilot can manually input the ground speed guidance $v_c$ (or converted air speed guidance) from the guidance display. For lateral guidance, the pilot could input the commanded heading $\Psi_{com}$ or the commanded track angle $\chi_{com}$ into the autopilot. Alternatively, the pilot can input a heading or track angle to make the aircraft match the commanded bank angle guidance $\mu_c$. It should be noted that, in most autopilots, the bank angle or turn rate cannot be specified in addition to the commanded heading and track angle. Thus, the follower cannot track perfectly during a turn when using the autopilot for lateral guidance. For vertical guidance, the pilot inputs the commanded altitude $h_{com}$ into the autopilot. The target climb rate or flight path angle guidance may also be specified.

In the autopilot coupled flight mode, it may be possible to fly all or part of position keeping missions hands off. The automatic guidance could be provided to the autopilot directly or through the FMS as follows: longitudinal/speed guidance can be provided to the autothrottle by $v_c$; lateral guidance can be provided to the autopilot by $\mu_c$; and, vertical guidance can be provided to the autopilot with $h_c$ and $h_{dot}{}^t$ (or the equivalent flight path angle $\gamma_c$). The interface details depend on each autopilot or FMS implementation.

The track velocity ($v_{track}$, $\chi_{track}$, and $\gamma_{track}$), the commanded maneuver track rates ($v_{dottrack}$, $\chi_{dottrack}$, and $\gamma_{dottrack}$), and the formation tracking error (e) are inputs to the position guidance law calculations performed by the position keeping guidance law block 12. In order to make the position guidance law calculations described above, the track velocity, the commanded maneuver track rates, the formation tracking error, and other variables need to be expressed with consistent reference frames and clear definitions relative to the formation geometry.

Military transport aircraft in formation fly with respect to the leader. Thus, it makes sense to define the formation geometry as a relative distance with respect to the leader. The nominal formation separation distance is defined as vector $\Delta x_{nom}$ (with components $\Delta x_{nom}$, $\Delta y_{nom}$, and $\Delta z_{nom}$). That is, this vector represents the formation separation distance that is desired during nominal position keeping and commanded simultaneous maneuvers. To be able to specify values for the distance vector $\Delta x_{nom}$, this distance vector should be defined with respect to a reference frame. The reference frame for this purpose is called the position keeping reference frame and is denoted $(\ )^{PK}$. The position keeping reference frame is centered on the follower and its x axis is along a reference angle designated as $\Psi_{PK}$, which is measured clockwise from North.

Figure 12:
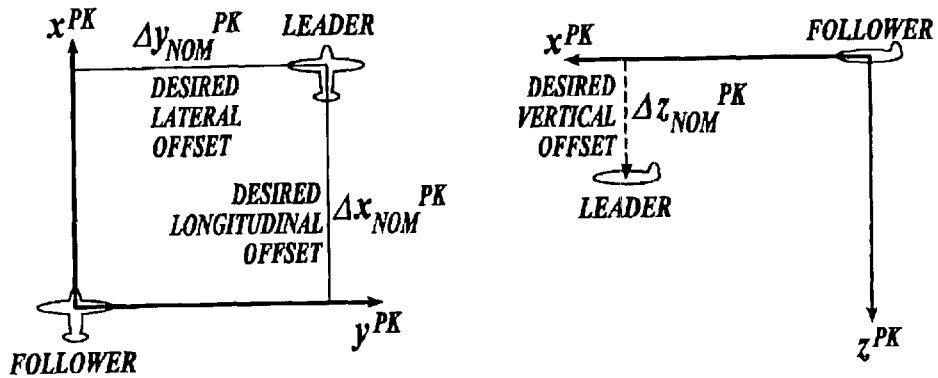
FIG. 12 is a diagram illustrating a position keeping reference frame PK useful in performing the position guidance law calculations.

As shown in FIG. 12, the nominal longitudinal separation $\Delta x_{nom}{}^{PK}$ is defined as the distance between the leader and follower along the position keeping frame x axis ($x^{PK}$). This distance is defined as positive if the leader is ahead of the follower. The nominal lateral separation $\Delta y_{nom}{}^{PK}$ is defined as the distance between the leader and follower along the PK frame y axis ($y^{PK}$). This distance is defined as positive if the leader is to the right of the follower. The nominal vertical separation $\Delta z_{nom}{}^{PK}$ is defined as the distance between the leader and follower along the PK frame z axis ($z^{PK}$). This distance is defined as positive if the leader is below the follower.

Figure 13:
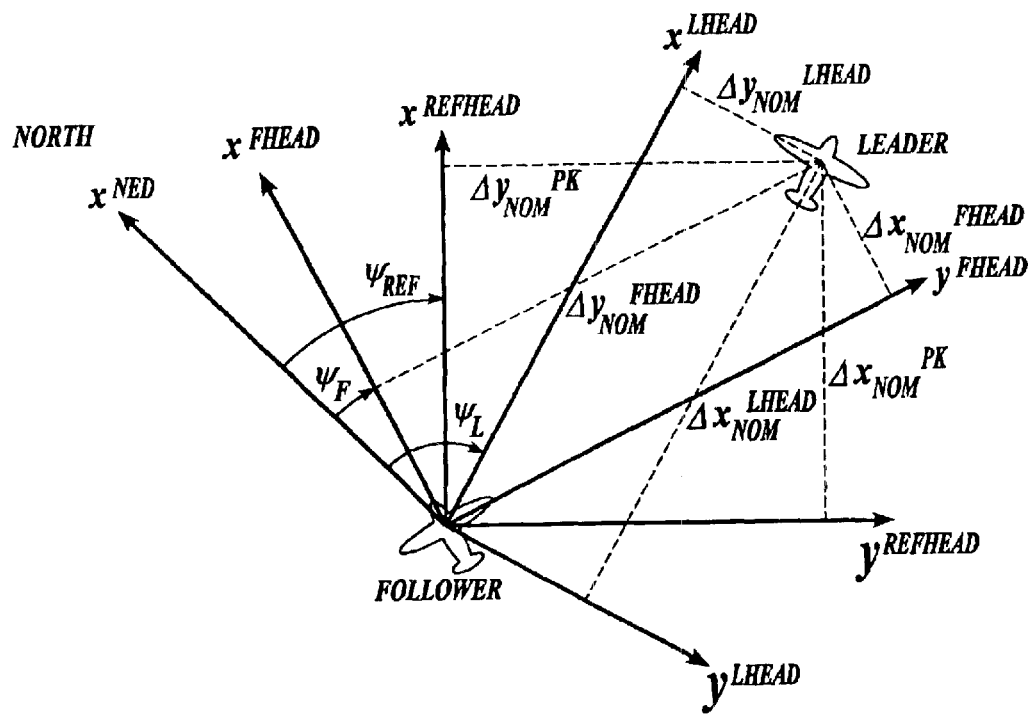
FIG. 13 illustrates three possibilities for defining a reference heading $\Psi_{PK}$ for the PK frame.

The definition of the reference heading $\Psi_{PK}$ for the PK reference frame is important. FIG. 13 illustrates three possibilities: using the leader heading $\Psi_L$ as a reference, using the follower heading $\Psi_F$ as a reference, and using the desired heading $\Psi_{ref}$ as a reference. If the aircraft are tracking perfectly, then $$\Psi_L = \Psi_F = \Psi_{ref} \tag{44}$$

so that there is no difference between the reference frames. However, if these headings are different, the formation separations, relative positions, and tracking error are different in each frame.

There are eight possible definitions of the position keeping reference frame. (1) If $\Psi_{PK} = \Psi_F$, the tracking errors are referenced along the heading of the follower aircraft. (2) If $\Psi_{PK}=\Psi_{Fref}$, the tracking errors are referenced to the heading that the follower should be tracking. (3) If $\Psi_{PK}=\Psi_L$, the tracking errors are referenced to the heading that the leader is tracking. (4) If $\Psi_{PK}=\Psi_{Lref}$, the tracking errors are referenced to the heading that the leader should be tracking. (5) If $\Psi_{PK}=\chi_F$, the tracking errors are referenced along the current track of the follower aircraft. (6) If $\Psi_{PK}=\chi_{Fref}$, the tracking errors are referenced to the track angle that the follower should be tracking. (7) If $\Psi_{PK}=\chi_L$, the tracking errors are referenced along the track angle of the leader aircraft. (8) If $\Psi_{PK}=\chi_{Lref}$, the tracking errors are referenced to the heading that the leader should be tracking.

Definition (1) is used in current position keeping systems. Using definition (2) eliminates the variation in the lateral and longitudinal tracking errors that come with small changes in heading as the follower maneuvers to maintain the formation shape. Definition (3) requires knowledge of the leader's heading. Using definition (4) eliminates the variation in the lateral and longitudinal tracking errors that arise with small changes in heading as the leader maneuvers. Definition (4) requires knowledge of the leader's intended heading, and is frequently the same as definition (2) because the leader and follower usually track the same reference heading. Definition (5) requires knowledge of the follower's track angle. Using definition (6) eliminates the variation in the lateral and longitudinal tracking errors that come with small changes in track as the follower maneuvers to maintain the formation shape. Definition (7) requires knowledge of the leader's track angle. Using definition (8) eliminates the variation in the lateral and longitudinal tracking errors that come with small changes in track as the follower maneuvers to maintain the formation shape, and requires knowledge of the leader's intended track angle.

When the aircraft is not performing a commanded turn maneuver or a drop maneuver, either definition (2) or definition (6) is used depending on whether the aircraft are tracking to a commanded heading or to a commanded track angle. By using a fixed reference that is independent of the variations in heading of the leader or follower, cleaner tracking can be expected. In addition, using these definitions should be beneficial during formation join-up.

When the aircraft is performing a commanded turn maneuver, the reference heading or track angle changes as the maneuver progresses. Therefore, when the aircraft is performing a commanded turn maneuver, definition (3) or definition (7) is instead used depending on whether the aircraft are tracking to a commanded heading or to a commanded track angle. If the leader track or heading angle is not available, it can be estimated based on the time the maneuver started and the desired turn rate. When the aircraft is performing a drop maneuver, definition (3) or definition (7) is used depending on whether the aircraft are tracking to a commanded heading or to a commanded track angle.

Figure 14A:
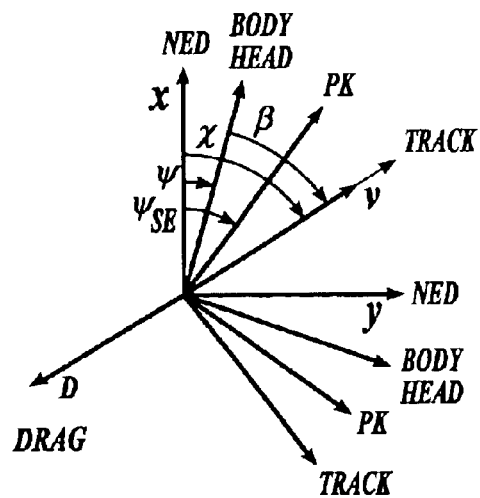
FIG. 14 illustrates a NED (north, east, down) inertial reference frame.
Figure 14B:
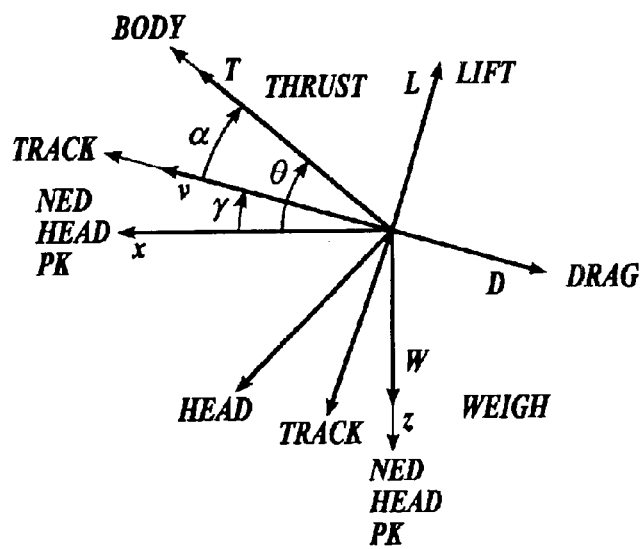
Figure 14C:
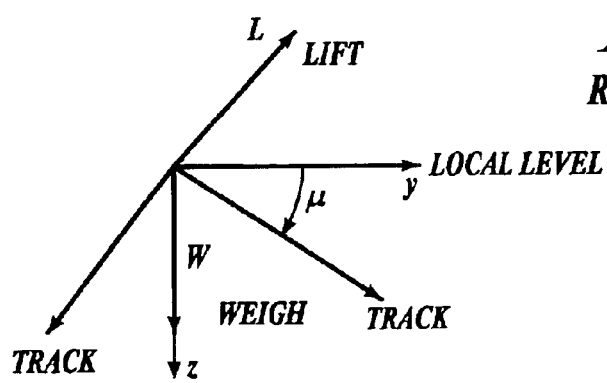

The other reference frame that is used frequently is the North East Down (NED) reference frame. For example, the formation tracking error $e^{NED}$ that is input into the position keeping guidance laws at the gain block 44 as shown in FIG. 11 is expressed in the NED frame. As shown in FIG. 14, the NED frame is an inertial reference frame, with the x-axis along North, the y-axis along East, and the z-axis pointing down. It is the reference frame in which GPS velocity is often represented. The track errors may be transformed to the NED frame prior to being input to the guidance equations described above in relation to FIG. 11. In the dynamic equations for the aircraft, $\xi$ is North position, $\eta$ is East position, and h is altitude. These positions can also be represented according to the following equations:

$$\xi = x^{NED} \quad (45)$$

$$\eta = y^{NED} \quad (46)$$

$$h = z^{NED} \quad (47)$$

As discussed above, the PK frame is the frame used to compute the lateral, longitudinal, and vertical tracking errors. The x-axis and the y-axis are in a locally level plane, and the z-axis is down. The angle between the x-axis of the PK frame and the x-axis of the NED frame is $\Psi_{PK}$, and the PK frame is related to the NED frame by rotation about the $z^{NED}$ by $\Psi_{PK}$.

The track velocity and maneuver track rate calculations are summarized in FIG. 15 for simple maneuvers and in FIG. 16 for combined maneuvers. In FIGS. 15 and 16, the subscript "com" designates a commanded value, and the subscript "dotcom" designates a time derivative of a commanded value. The commanded values are transmitted to the followers by the leader, by another aircraft, or by a ground station. The time derivatives may be transmitted by the leader, may be input by the followers, or may be a system default. Frequently, $\chi_{dottrack}$ is calculated from a default bank angle $\mu_{com}$ and a commanded ground speed $v_{com}$. Simple maneuvers are individual maneuvers, like a speed change or a heading change or an altitude change. Combined maneuvers are combinations of simple maneuvers.

Again, the track velocity components are $v_{track}$, $\chi_{track}$, and $\gamma_{track}$. The values of the track velocity depend on whether the commanded maneuvers are simultaneous or sequential, and whether a sequential maneuver is pending or executing. For position keeping only and altitude changes, $v_{track}$ is the commanded ground speed $v_{com}$. For commanded simultaneous speed changes, $v_{track}$ is the leader ground speed $v_L$ that is provided over a communication link. For commanded sequential speed changes, $v_{track}$ is the delayed leader speed $v_L(t-t_{delay})$, where $$t_{delay} = \Delta x_{nom}^{PK}(t_{startman})/v_{com}(t_{startman}) \quad (48)$$

and where $t_{startman}$ is the time at which the leader starts the maneuver and $\Delta x_{nom}^{PK}$ is the longitudinal formation separation. If the longitudinal formation spacing is specified as the time $\Delta t_{nom}$, then $$t_{delay} = \Delta t_{nom} \quad (49)$$

During turn maneuvers, the track speed $v_{track}$ is adjusted by $\Delta v_{turn}$ so that the leader and follower track concentric circles. In general, $\Delta v_{turn}$ is given by the following equation:

$$\Delta v_{turn} = \Delta y_{nom}^{PK} g \tan(\mu_L)/v_L \quad (50)$$

For the leader, $\Delta y_{nom}^{PK}$ is zero, and there is no speed adjustment. Since the leader is expected to turn to a predetermined bank angle $\mu_{com}$, there is no need to transmit the leader bank angle, and $\Delta v_{turn}$ is given by the following equation:

$$\Delta v_{turn} = \Delta y_{nom}^{PK} g \tan(\text{turn\_direction} * \mu_{com})/v_L \quad (51)$$

If the commanded turn is sequential, then $\Delta v_{turn}$ is given by the following equation:

$$\Delta v_{turn} = \Delta y_{nom}^{PK} g \tan(\text{turn\_direction} * \mu_{com})/v_L(t-t_{delay}) \quad (52)$$

The track angle $\chi_{track}$ is set to the commanded track angle $\chi_{com}$ when the aircraft is not executing a commanded turn maneuver or a drop maneuver. When the aircraft is performing a simultaneous turn, then the track angle is the leader track angle as given by the following equation:

$$\chi_{track} = \chi_L \tag{53}$$

For a sequential turn, the track angle is the delayed leader track angle as given by the following equation:

$$\chi_{track} = \chi_L(t - t_{delay}) \tag{54}$$

During a drop maneuver, $\chi_{track} = \chi_{waypoint}$ where $\chi_{waypoint}$ is given by the following equation:

$$\chi_{waypoint} = \tan^{-1}\left(\frac{\eta_{drop} - \eta}{\xi_{drop} - \xi}\right) \tag{55}$$

and where $x_{drop} = (\xi_{drop}, \eta_{drop}, h_{drop})$ are the drop maneuver coordinates and $x = (\xi, \eta, h)$ is the vehicle position in NED coordinates.

The flight path angle $\gamma_{track}$ is nonzero during altitude change maneuvers and, for simple maneuvers, is calculated from the commanded climb or descent rate $h_{dotcom}$ and the commanded speed $v_{com}$ according to the flowing equation:

$$\gamma_{track} = \sin^{-1}(h_{dotcom}/v_{com}) \tag{56}$$

The commanded maneuver track rates are the feedforward information that is input to the summer 54 in order to improve tracking performance for commanded maneuvers. For commanded speed change maneuvers, the predetermined commanded acceleration $v_{dotcom}$ is provided as an input. For commanded turn maneuvers, the predetermined commanded track angle (turn) rate $\chi_{dotcom}$ is provided as an input. During a turn, the leader and follower should have the same turn rate. The turn rate $\chi_{dot}$ can be expressed according to the following equation:

$$\chi_{dot} = \tan(\mu)(v\gamma_{dot} + g\cos(\gamma))/(v\cos(\gamma)) \tag{57}$$

Since the follower turn rate should be the same as the leader turn rate, the commanded turn rate for the follower is given by the following equation:

$$\chi_{dotcom} = \tan(\mu_L)(v_L\gamma_{dotL} + g\cos(\gamma_L))/(v_L\cos(\gamma_L)) \tag{58}$$

Some simplifications can be made to minimize the data needed from the leader for tracking. The bank angle $\mu_L$ for the leader during a turn should be the default value commanded times the turn direction. Therefore, $$\chi_{dotcom} = \tan(\text{turn\_direction} * \mu_{com})(v_L\gamma_{dotL} + g\cos(\gamma_L))/(v_L\cos(\gamma_L)) \tag{59}$$

If it is assumed that $\gamma_{dotL}$ is zero, which is the case except when pitching to start or end a climb maneuver, then $$\chi_{dotcom} = \tan(\text{turn\_direction} * \mu_{com})g/v_L \tag{60}$$

These two simplifications eliminate the need for the leader to transmit its bank angle or pitch rate.

For commanded altitude changes, no flight path angle rate $\gamma_{dottrack}$ is commanded for aircraft like military transport aircraft. Commanding a flight angle rate might be appropriate for high performance aircraft. Combined maneuvers use the feedforward information for each sub-maneuver.

With regard to FIGS. 15 and 16, pending and sequential maneuvers only apply to a follower.

The formation tracking error e is the error between the aircraft position and the desired aircraft position. The relative position between the leader and the follower aircraft in the formation is calculated as $$\Delta x = x_L - x_F \tag{61}$$

In general, the formation tracking error vector e is calculated as $$e = \Delta x - \Delta x_{ref} \tag{62}$$

where $\Delta x_{ref}$ is the desired relative position vector between the aircraft and the leader. The vectors $\Delta x$, $\Delta X_{ref}$, and e are illustrated in FIG. 17. As shown in FIG. 17, the leader is too far ahead and to the left for the desired formation geometry. Another way to look at it is that the follower is too far behind and to the right. Thus, if the follower moves ahead and to the left, in the direction of e, the formation will have the desired geometry (i.e., $\Delta x = \Delta x_{ref}$).

It can be difficult to equate the components of $\Delta x$, $\Delta x_{ref}$, and e with specific directions to envision where the leader and follower are with respect to one other and where they need to be to preserve the desired geometry of the formation. Thus, FIG. 18 translates the components of these vectors into directions to make visualization easier, assuming that the vectors are represented in the position keeping reference frame.

FIG. 19 summarizes the guidance tracking error calculations. When there are no commanded maneuvers or simultaneous commanded maneuvers, the relative position is calculated by determining the difference between the leader and follower positions. For pending sequential commanded maneuvers, the relative position is calculated using the position of the leader at the start ($t_{startman}$) of its corresponding maneuver. For sequential commanded maneuvers that are executing, the relative position is computed using the delayed leader position.

The reference relative position vector $\Delta x_{ref}$ in the formation geometry is the same as the nominal relative position vector $\Delta x_{nom}$ (which is composed of the components $\Delta x_{nom}$, $\Delta Y_{nom}$ and $\Delta z_{nom}$) when there are no pending maneuvers or there are no simultaneous maneuvers being executing. For pending maneuvers, the $\Delta x_{nom}$ component of the reference longitudinal relative position vector $\Delta x_{ref}$ is calculated using the vehicle position and the position of the leader at the start of the maneuver, as given by the following equation:

$$\Delta x_{nom}^{PK} = x_L^{PK}(t_{startman}) - x^{PK} \tag{63}$$

A pending maneuver designates the waiting of the follower before the follower begins its part of a sequential maneuver that was previously started by the leader. For executing sequential commanded maneuvers $$\Delta x_{nom}^{PK} = 0 \tag{64}$$

since the follower is tracking the delayed or ghost position of the leader.

The formation tracking error vector used by the guidance calculations is $e^{NED}$, which is calculated from the vector $e^{PK}$ by a coordinate transformation that is discussed above in relation to FIG. 14. The lateral tracking error $e_y$ is always calculated using the following equation:

$$e_y^{PK} = \Delta y^{PK} - \Delta y_{ref}^{PK} \tag{65}$$

The longitudinal tracking error $e_x$ is calculated using the following equation:

$$e_x^{PK} = \Delta x^{PK} - \Delta x_{ref}^{PK} \quad (66)$$

except for pending maneuvers. For pending maneuvers, the longitudinal tracking error $e_x$ is zero because tracking is based only on speed, not on a longitudinal position. Accordingly, during a pending maneuver, while the follower is waiting to execute a commanded maneuver, the follower is guided to the exact longitudinal location where the leader started that maneuver. If there are no commanded altitude changes, the vertical tracking error $e_z$ is computed using the current altitude and commanded altitude as given by the following equation:

$$e_z^{PK} = z^{PK} - (-h_{com}) \quad (67)$$

For commanded altitude changes and turns, the vertical tracking error $e_z$ is zero since tracking is based only on vertical rate, not on vertical position.

The position keeping reference angle $\chi_{PK}$ is set to the commanded track or heading angle if there are no commanded turns or drop maneuvers executing. During simultaneous turns, $\Psi_{PK}$ is set to the leader heading or track angle. During sequential turns, $\Psi_{PK}$ is set to the delayed leader heading or track angle. During drop maneuvers, $\Psi_{PK} = \Psi_{waypoint}$.

With regard to FIG. 19, pending and sequential maneuvers only apply to a follower.

The maneuver commands may take the general form shown in FIG. 20. There is flexibility in the present invention to command ground speed or air speed, track angle or heading, and geometric altitude or barometric altitude. The default acceleration, bank angle, and climb or descent rate could be set by the crew, transmitted by the leader, or come from another source. Frequently, these values are constant for a specific type of military transport aircraft.

As discussed above, there are a variety of maneuvers that can be commanded, and many of the position keeping guidance calculation inputs are based on the type of maneuvers being executed. For convenience, the position keeping guidance calculations described herein use maneuver modes that are also calculated with an associated maneuver mode logic to aid in calculating the track states, formation tracking error, and maneuver track rates.

The maneuver mode logic proceeds as follows: (1) determine if any commanded maneuvers are complete —a commanded maneuver is complete if the current aircraft state is either past the commanded state or within a certain threshold; (2) determine if any pending maneuvers should now be executing; (3) determine if a new maneuver is commanded—a new maneuver is commanded if the maneuver command differs from the previous maneuver command by a certain threshold; (4) if a new maneuver is commanded, calculate the direction of the maneuver—for example, accelerating or decelerating, turning left or right, climbing or descending; (5) if the maneuver is a sequential maneuver, calculate the delay time and store the time at which the leader initiated the maneuver.

As discussed above, displays may be used by the position keeping system 10 to convey information back to the pilots and operators. There are three classification for these displays: (1) guidance displays; (2) formation traffic displays; and, (3) displays that carry general information about the system, including messages from other aircraft in the formation. These displays can reside on a variety of hardware devices. The TA/VSI display is a dedicated display device that accompanies traditional TCAS systems. The specific output is determined by the control unit and can include guidance cues as well as formation traffic information.

The position keeping system generates a wealth of information that could be displayed to the pilot. This information includes the following: (i) the lateral, longitudinal and vertical deviations from the leader position or commanded altitude; (ii) the maneuver commands such as the commanded track angle $\chi_{com}$ or the commanded heading $\Psi_{com}$, the commanded ground speed $v_{com}$ or the commanded air speed $vas_{com}$, and the commanded geometric altitude $h_{com}$ or the barometric altitude $hbaro_{com}$; (iii) the track climb rate $h_{dot}^t$; (iv) the bank angle guidance $\mu_c$, the thrust guidance $T_c$, the angle of attack guidance $\alpha_c$, the ground speed guidance $v_c$, or the flight path angle guidance $\gamma_c$; (v) the ground speed guidance $v_c$ converted to air speed guidance $vas_c$; (vi) the leader ground speed, air speed, heading, track angle, bank angle, geometric and/or barometric altitude; (vii) the relative speed between the leader and follower; and (viii) maneuver preparation and execution countdowns and maneuver status.

Figure 21:
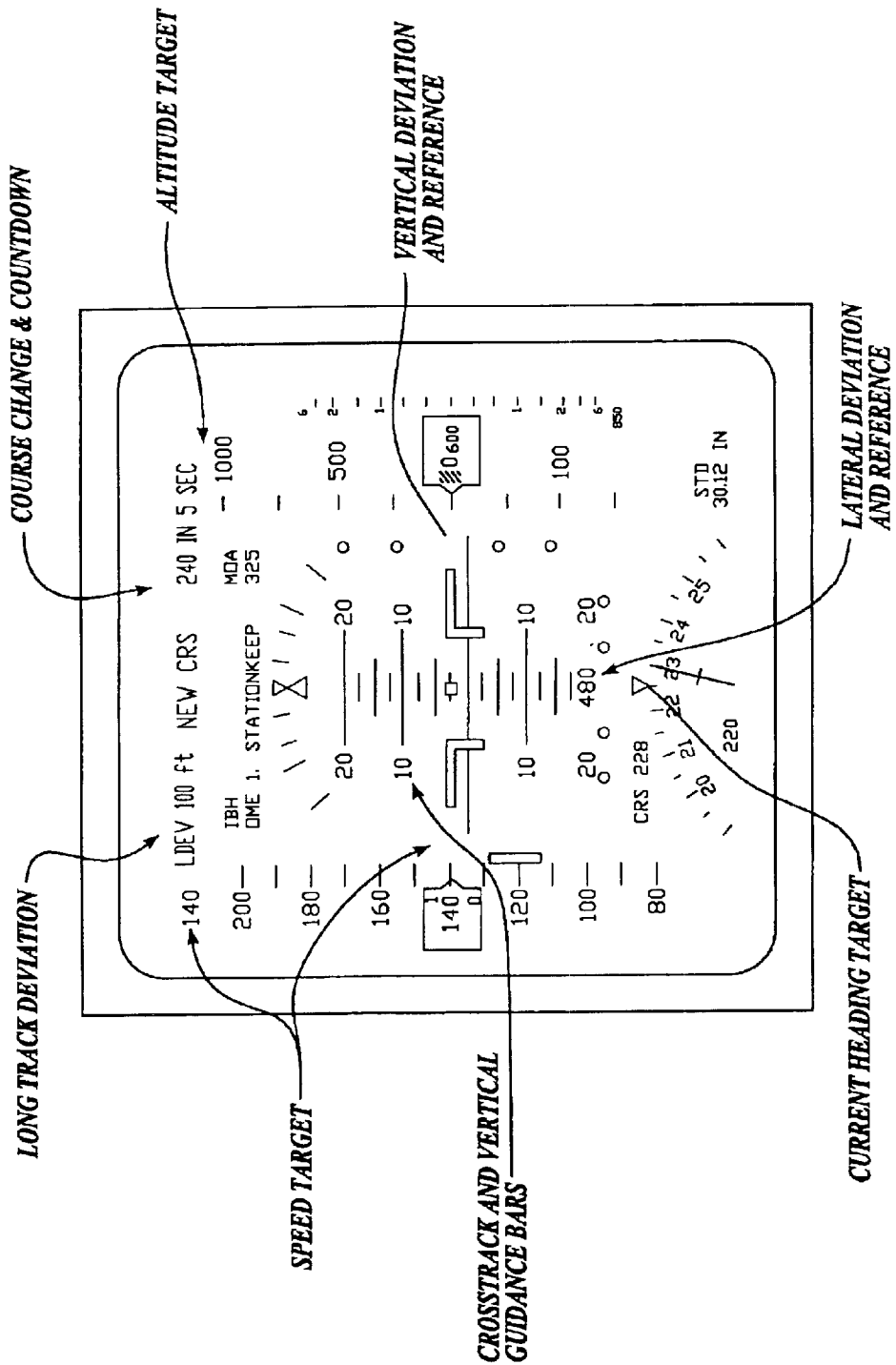
FIG. 21 illustrates a primary flight display (PFD) that is operating in position keeping mode; and, FIG. 22 illustrates a traffic control display (such as TCAS) modified to operate in a position keeping mode.
Figure 22:
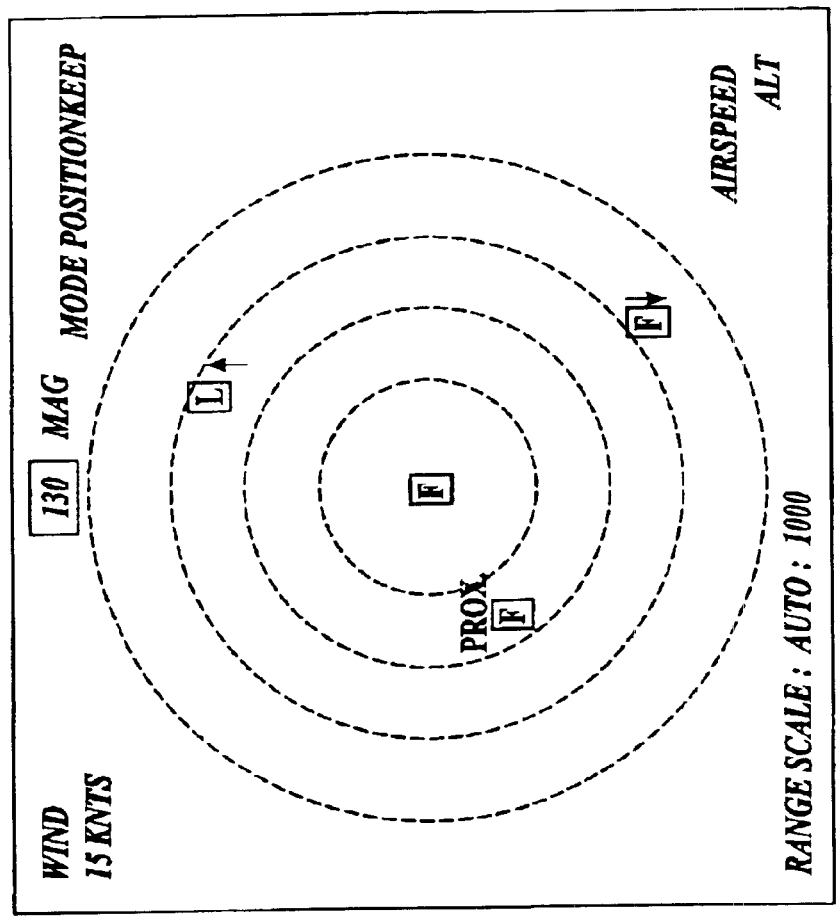

Guidance information can be conveyed to the pilot many different ways. One approach is to use the flight director, which can be part of the primary flight display (PFD) or part of a separate attitude direction indicator (ADI). FIG. 21 shows a PFD that is operating in position keeping mode. Guidance cues such as speed (ground speed $v_c$, air speed $vas_c$, command ground speed $V_{com}$, or command air speed $vas_{com}$), altitude ($h_{com}$ or $h_L$), and heading targets ($\Psi_{com}$ or $\chi_{com}$) are displayed. Vertical and lateral guidance bars are available to inform the pilot of lateral and longitudinal position errors. The longitudinal position error is not displayed graphically on the PFD in FIG. 21 because it does not fit naturally into the framework of current PFD's. If desired, however, such graphical displays can be added to the position keeping mode of the PFD/EADI.

Guidance information can also be displayed on the dedicated TCAS TA/VSI display. The display format may be different from that of a traditional PFD, but the equivalent information can be displayed.

Traffic displays provide a plan form view of other aircraft with respect to a pilot's own ship. This display may be shown on the secondary display unit of an electronic flight information system, or it may be shown as one of the display modes of the TA/VSI.

The default mode of operation is to have the pilot's own ship at the center of the display, although other modes may be implemented instead. Symbols enable pilots to distinguish between formation aircraft and other aircraft. If an aircraft is a follower, its lead aircraft will be designated. Range rings assist pilots in determining relative horizontal ranges. Default but adjustable range scales may be provided. For vertical reference, numbers and arrows adjacent to the symbols display relative altitude and altitude rates of the other aircraft. FIG. 21 shows an example of such a formation display. Miscellaneous information related to position keeping (such as the computer air release point for a drop maneuver) may also be displayed.

Certain modifications of the present invention have been discussed above. Other modifications will occur to those practicing in the art of the present invention. For example, the embodiment of the invention as described above has been described in relation to aircraft, and some of the examples have been pertinent to military transport aircraft. However, the present invention also applies to other types of aircraft and rotorcraft and any vehicles that travel in formation.

Also, it is possible for the formation to track a virtual or imaginary leader whose position or trajectory is calculated or provided by another vehicle or ground station. In one example, the virtual leader desired position could be calculated based on a weighted average of the position of all vehicles in the formation. This calculation could be made so as to minimize the adjustments required to maintain a formation shape. In another example, the virtual leader could be a four-dimensional trajectory (three dimensions related to position and one dimension for time points) that is provided before flight or that is datalinked from another vehicle or a ground station.

Additionally, the maneuvers discussed above include speed changes, altitude changes, turns, drop maneuvers, and combinations of the preceding. However, the present invention can be extended to include any type of maneuver that can be specified in terms of an action or actions that should be performed in conjunction with a position and/or a position change, a velocity and/or a velocity change, and/or an acceleration and/or an acceleration change.

Moreover, the guidance logic that calculates the thrust $T_c$, the bank angle $\mu_c$, and the angle of attack ac is based on dynamically inverting a set of equations of motion for an aircraft. Similar equations are used to calculate the limit logic of the block 56. These equations of motion do not include the effects of wind. However, it is straightforward to invert equations of motion for an aircraft that include wind in order to produce associated equations for the thrust $T_c$, the bank angle $\mu_c$, and the angle of attack $\alpha_c$ inclusive of wind.

Furthermore, in order to calculate the controls for a different vehicle, that vehicle's equations of motion would be substituted for the aircraft equations of motion, and the associated controls for the guidance block 58 would be calculated by inverting those equations of motion. For example, the equations of motion for a land vehicle are different than for an aircraft, since the principles of motion are different. A land vehicle's controls would include throttle, which is analogous to thrust, and steering angle, which is analogous to bank angle, but not vertical control like flight path angle since the vehicle follows the ground.

Also, the invention described above could be implemented so that each vehicle computes its own guidance corrections. Alternatively, the guidance corrections could be calculated on the ground or on board other aircraft, and these guidance corrections could be transmitted as guidance commands via a datalink.

Additionally, much of the above description is based on inertial quantities. However, if desired, inertial quantities can be converted easily to air mass referenced quantities. Therefore, inertial referenced quantities and air mass referenced quantities are used interchangeably herein.

The position keeping guidance system 10 may be implemented in software executed by a computer, in hardware such as programmable logic arrays or other digital processing circuitry, etc.

Each aircraft in a formation is equipped to make the calculations described above. Thus, each aircraft in the formation can act as a leader and a follower.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of keeping position of a vehicle in a vehicle formation comprising:

acquiring a track velocity input;

acquiring a formation error input;

determining a velocity output for the vehicle based on the track velocity input and the formation position error, wherein the velocity output indicates a velocity required to maintain the vehicle in the vehicle formation, wherein the determining of a velocity output compromises performing a dynamic inversion based on the track velocity input and the formation position error input in order to determine the velocity output.

2. The method of claim 1 further compromising:

converting the velocity output to an acceleration output;

acquiring a commanded acceleration input; and determining guidance corrections based on the acceleration output and the commanded acceleration input.

3. The method of claim 2 wherein the guidance corrections comprise an acceleration required to make formation corrections and to implement commanded maneuvers.

4. The method of claim 3 further comprising displaying the acceleration.

5. The method of claim 2 wherein the guidance corrections comprise a velocity to make formation corrections and to implement commanded maneuvers.

6. The methods of claim 5 further comprising displaying the velocity.

7. The method of claim 2 further comprising displaying the guidance corrections to an operator of the vehicle to enable the operator to make corrections to a position of the vehicle in the vehicle formation.

8. The method of claim 2 further comprising supplying the guidance corrections to an automatic pilot.

9. The method of claim 2 further comprising supplying the guidance corrections to a flight management system.

10. The method of claim 2 wherein the track velocity input comprises ground speed, track angle, and flight path angle, and wherein the commanded acceleration input comprises a commanded speed change, a commanded track angle rate, and a commanded flight path angle rate.

11. The method of claim 10 wherein the acquiring of a track velocity input comprises converting the ground speed, the track angle, and the flight path angle into directional track state components based on a reference frame, wherein the acquiring of a formation position error input comprises acquiring directional formation position error components based on the reference frame, and wherein the determining of a velocity output comprises:

adding the directional track states components to the directional formation position error components to produce directional output components; and, dynamically inverting the directional output components so as to produce the velocity output including a desired track angle, a desired ground speed, and a desired flight path angle.

12. The method of claim 2 wherein the tack velocity comprises track air speed, track heading angle, and track flight path angle, and wherein the commanded acceleration input comprises a commanded air speed change, a commanded heading angle rate, and a commanded flight path angle rate.

13. The method of claim 2 wherein the acquiring of a track velocity input comprises converting the track velocity input into a directional track velocity input, wherein the acquiring of a formation position error input comprises acquiring a directional formation position error input, and wherein the determining of a velocity output comprises:

adding the directional track velocity input to the directional formation position error input to produce a directional output; and, dynamically inverting the directional output so as to produce the velocity output.

14. The method of claim 13 wherein the guidance corrections comprise accelerations required to make formation corrections.

15. The method of claim 1 wherein the acquiring of a track velocity input comprises converting the track velocity input into a directional track velocity input, wherein the acquiring of a formation position error input comprises acquiring a directional formation position error input, and wherein the determining of a velocity output comprises:

adding the direction track velocity input to the directional formation position error to produce a directional output; and, dynamically inverting the directional output so as to produce the velocity output.

16. The method of claim 15 further comprising displaying information required to make formation corrections.

17. The method of claim 1 wherein the track velocity input is based at least partially on information derived from a leader of the vehicle formation.

18. A method of keeping a position of a vehicle in a vehicle formation comprising:

receiving leader information over a communication link;

acquiring relative position information from a relative position measurement system;

selecting at least one of the leader information and the relative position information so as to provide selected information; and, determining guidance corrections based on the selected information, wherein the guidance corrections indicate corrections that are required to place the vehicle in the vehicle formation, wherein the selected information includes a track velocity and a formation position error related to the vehicle, wherein the determining of guidance corrections includes determining a velocity and the formation position error, wherein the velocity output comprises a velocity required to maintain the vehicle in the vehicle formation, wherein the selected information includes a commanded acceleration input, and wherein the determining of the guidance corrections includes:

converting the velocity output to an acceleration output; and, determining the guidance corrections based on the acceleration output and the commanded acceleration input, wherein the track velocity comprises ground speed, track angle, and flight path angle, and wherein the commanded acceleration input comprises a commanded speed rate, a commanded track angle rate, and a commanded flight path angle rate.

19. The method of claim 18 wherein the relative position measurement system comprises a traffic collision avoidance system.

20. The method of claim 18 wherein the leader information is received from a formation leader.

21. The method of claim 18 wherein the leader information is received from another vehicle.

22. The method of claim 18 wherein the leader information is received from a ground station.

23. The method of claim 18 further comprising receiving maneuver command information via the communication link, wherein the selecting of at least one of the leader information and the relative position comprises selecting at least on of the leader information, command information so as to provide the selected information.

24. The method of claim 23 wherein the maneuver command information is received from a formation leader.

25. The method of claim 23 where in the maneuver command information is received from another vehicle.

26. The method of claim 23 wherein the maneuver command information is received from a ground station.

27. The method of claim 18 wherein the guidance corrections comprise a command speed guidance $V_c$ and a commanded flight path angle guidance $V_c$ required to make formation corrections.

28. The method of claim 27 further comprising displaying the commanded speed guidance $V_c$ and the commanded flight path angle guidance $V_c$.

29. The method of claim 18 wherein the guidance corrections comprise a commanded bank angle $\mu_c$ required to make formation corrections.

30. The method of claim 18 wherein the guidance corrections comprise a thrust guidance TC required to make formation corrections.

31. The method of claim 18 wherein the guidance corrections comprise an angle of attack guidance $\alpha_c$ required to make formation corrections.

32. The method of claim 18 further comprising displaying the guidance corrections to an operator of the vehicle to enable the operator to make corrections to a position of the vehicle in the vehicle formation.

33. The method of claim 18 wherein the formation position error comprises directional formation position error rate components based on a reference frame, and wherein the determining of a velocity output comprises:

converting the ground speed, the track angle, and the flight path angle into directional track position rate components based on the reference frame;

adding the directional track position components to the directional formation position error or rate components to produce directional output rate components; and, dynamically inverting the directional output rate components so as to produce a desired track angle, a desired ground speed, and a desired flight path angle required to maintain the vehicle formation.

34. The method of claim 33 wherein the determining the guidance corrections based on the acceleration output and the commanded acceleration input comprises:

converting the desired track angle, the desired ground speed, and the desired flight path angle to a desired track angle rate, and desired speed rate, and a desired flight path angle rate; and, adding the desired track angle rate, the desired speed rate, and the desired flight path angle rate to the commanded track angle rate, the commanded speed rate, and the commanded flight path angle rate, respectively, in order to produce the guidance corrections.

35. The method of claim 34 further comprising displaying the guidance corrections to an operator of the vehicle.

36. A method of keeping position of a vehicle in a vehicle formation comprising:

acquiring a rate of the vehicle;

converting the vehicle rate to a directional vehicle rate;

acquiring a direction formation position error rate dependent upon an error in the position of the vehicle formation;

determining a desired vehicle rate based on the directional vehicle rate and the directional formation position error rate, wherein the desired vehicle rate indicates a rate required to maintain the vehicle in the vehicle formation;

converting the desired vehicle rate to a vehicle acceleration input;

acquiring a commanded acceleration; and, determining guidance corrections for the vehicle based on the vehicle acceleration input and the commanded acceleration, wherein the guidance corrections indicate guidance corrections required to maintain the vehicle in the vehicle formation and to respond to the commanded acceleration.

37. The method of claim 36 wherein the acquiring of a commanded acceleration comprises acquiring the commanded acceleration from the leader in the vehicle formation.

38. The method of claim 36 where in the acquiring of a commanded acceleration comprises acquiring the commanded acceleration from another vehicle.

39. The method of claim 36 wherein the acquiring of a commanded acceleration comprises acquiring the commanded acceleration from a ground station.

40. The method of claim 36 wherein the acquiring of a commanded acceleration comprises acquiring the commanded acceleration from a memory on the vehicle.

41. The method of claim 36 wherein the guidance corrections comprise velocity guidance.

42. The method of claim 36 where in the guidance corrections comprise acceleration guidance.

43. The method of claim 36 further comprising displaying the guidance corrections to an operator of the vehicle.

44. The method of claim 36 wherein the vehicle rate comprises a vehicle ground speed $v_{track}$, a vehicle track and angle $x_{track}$, and a vehicle flight path angle $y_{track}$, wherein the commanded acceleration comprises a commanded acceleration $v_{dottrack}$, $x_{dottrack}$, and $y_{dottrack}$, wherein the desired vehicle rate comprises a desired vehicle rate $v^c$, $x^c$, and $y^c$, wherein the converting of the vehicle rate to a directional vehicle rate comprises converting the vehicle ground speed, vehicle track angle, and vehicle flight path angle to a North position rate $\xi_{dot}^t$, and East position rate $\eta_{dot}^t$, and a vertical position rate $h_{dot}^t$, wherein the acquiring of a directional formation position error rate comprises acquiring a North formation position error rate $K_\epsilon e_\epsilon$, and east formation position error rate $K_\eta e_\eta$, and a vertical formation position error Rate $K_h e_h$, wherein the determining of a desired vehicle rate comprises (i) adding the North position rate $\xi_{dot}^t$ and the North formation position error rate $K_\epsilon e_\epsilon$ to produce a North error rate $\xi_{dot}^d$, (ii) adding the East position rate $\eta_{dot}^t$ and the East error rate $\eta_{dot}^d$, (iii) adding the vertical position rate $\xi_{dot}^t$ and the vertical formation position error rate $K_h e_h$ to produce a vertical error rate $h_{dot}^d$, and (iv) performing a dynamic inversion of the North error rate $\xi_{dot}^d$, the East error rate $\eta_{dot}^d$, and the vertical error rate $h_{dot}^d$ in order to determining the desired vehicle rate $v^c$, $x^c$, and $y^c$, wherein the converting of the desired vehicle rate $v^c$, $x^c$, and $y^c$ to a vehicle acceleration input comprises converting the desired vehicle rate to a vehicle acceleration input $V_{dot}$, $X_{dot}$, $Y_{dot}$, and wherein the determining of the guidance corrections comprises adding the vehicle acceleration input $V_{dot}^t$, $X_{dot}^t$, $Y_{dot}^t$, to the commanded acceleration $V_{dottrack}$, $X_{dottrack}$, $Y_{dottrack}$, to produce a commanded acceleration $V_{dot}^d$, $X_{dot}^d$, $Y_{dot}^d$, and determining the guidance corrections based on the commanded acceleration $V_{dot}^d$, $X_{dot}^d$, $Y_{dot}^d$.

45. The method of claim 44 further comprising displaying the guidance corrections to an operator of the vehicle.

46. The method of claim 44 wherein the vehicle rate is converted to the North position rate $\xi_{dot}^t$, the East position rate $\eta_{dot}^t$, and the vertical position rate $h_{dot}^t$ based on the following equations:

$$\xi_{dot}^t = v_{track} \cos(y_{track}) \cos(x_{track})$$

$$\eta_{dot}^t = v_{track} \cos(y_{track}) \sin(x_{track})$$

$$h_{dot}^t = v_{track} \sin(y_{track}).$$

47. The method of claim 44 wherein the desired vehicle rate $v^c$, $x^c$, and $y^c$ is determined based on the following equations:

$$v^c = \text{sign}\sqrt{(\xi_{dot}^d)^2 + (\eta_{dot}^d)^2 + (h_{dot}^d)^2}$$

$$X^{c'} = \tan^{-1}(\eta_{dot}^d / \epsilon_{dot}^d)$$

$$\text{sign} = 1 \text{ if } |x^{c'}| \leq \pi/2$$

$$= -1 \text{ if } |x^{c'}| > \pi/2$$

$$X^{c'} = \tan^{-1}(\eta_{dot}^d / \epsilon_{dot}^d)$$

$$X^c = X^c \eta_{dot}^t \text{ if } |x^{c'}| \leq \pi/2$$

$$= \pi - X^{c'} \text{ if } |x^{c'}| > \pi/2$$

$$Y^c = \sin^{-1}(h_{dot}^d / v^c).$$

$$Y^c = \sin^{-1}(h_{dot}^d / v^c).$$

48. The method of claim 44 wherein the guidance corrections comprise $v_c$, $y_c$, $\mu_c$, $\alpha_c$, and $T_c$, wherein the guidance corrections $v_c$, $y_c$, $\mu_c$, $\alpha_c$, and $T_c$ are determined based on the following equations:

$$v_c = v + ]v_{dot}^d$$

$$y_c = y + ]y_{dot}^d$$

$$\mu_c = \tan^{-1}(v \cos(y) x_{dot}^d)/(vy_{dot}^d + g \cos(y))$$

$$\tan \alpha_c = ((mvy_{dot}^d + mg \cos(y/\cos(\mu_c) - L/(mv_{dot}^d + D + mg \sin(y)))$$

$$T_c = (mv_{dot}^d + D + mg \sin(y))/\cos(\alpha_c)$$

wherein v and y represent a current state of the vehicle, wherein L and D are modeled according to the following equations:

$$L = qSC_L$$

$$D = qSC_D$$

$$C_L = C_L \alpha_0 + C_L \alpha \alpha$$

$$C_D = C_{Dmin} + KC_L^2$$

wherein q is dynamic pressure, and wherein K, $C_{Dmin}$, $c_L \alpha_0$, $C_L \alpha$, and S are constants.

49. The method of claim 48 further comprising displaying $v_c$, $y_c$, $\mu_c$, $\alpha_c$, $T_c$, $V_{dot}^d$, $X_{dot}^d$, and $Y_{dot}^d$ to an operator of the vehicle.

50. The method of claim 44 wherein the vehicle rate comprises a vehicle ground speed $V_{track}$, and a vehicle flight path angle $V_{track}$ wherein the vehicle rate is converted to the North position rate $\xi_{dot}^t$, the East position rate $\eta_{dot}^t$, and the vertical position rate $h_{dot}^t$ based on the following equations:

$$\xi_{dot}^t = V_{track} \cos(Y_{track}) \cos(X_{track})$$

$$\eta_{dot}^t = V_{track} \cos(Y_{track}) \sin(X_{track})$$

$$h_{dot}^t = V_{track} \sin(Y_{track})$$

wherein the desired vehicle rate $v_c$, $x_c$, $y_c$ and is determined by the following equations:

$$v^c = \text{sign}\sqrt{(\xi_{dot}^d)^2 + (\eta_{dot}^d)^2 + (h_{dot}^d)^2}$$

$$X^{c'} = \tan^{-1}(\eta_{dot}^d/\xi_{dot}^d)$$

$$\text{sign} = 1 \text{ if } |x^{c'}| \leq \pi/2$$

$$= -1 \text{ if } |x^{c'}| > \pi/2$$

$$X^{c'} = \tan^{-1}(\eta_{dot}^d/\xi_{dot}^d)$$

$$X^c = X^{c'} \text{ if } |x^{c'}| \leq \pi/2$$

$$= \pi - X^{c'} \text{ if } |x^{c'}| > \pi/2$$

$$Y^c = \sin^{-1}(h_{dot}^d/v^c)$$

wherein the guidance corrections comprise $v_c$, $y_c$, $\mu_c$, $\alpha_c$, and $T_c$, wherein the guidance corrections $v_c$, $y_c$, $\mu_c$, $\alpha_c$, and $T_c$, are determined based on the following equations:

$$v_c = v + |v_{dot}^d$$

$$y_c = y + |y_{dot}^d$$

$$\mu_c = \tan^{-1}(v\cos(y)x_{dot}^d)/(vy_{dot}^d + g\cos(y))$$

$$\tan \alpha_c = ((mvy_{dot}^d + mg\cos(y))/\cos(\mu_c) - L/(mv_{dot}^d + D + mg\sin(y)))$$

$$T_c = (mv_{dot}^d + D + m g \sin(y))/\cos(\alpha_c)$$

wherein v and y represent a current state of the vehicle, wherein L and D are modeled according to the following equations:

$$L = qSC_L$$

$$D = qSC_D$$

$$C_L = C_L\alpha_0 + C_L\alpha\alpha$$

$$C_D = C_{Dmin} + KC_L^2$$

wherein q is dynamic pressure, and wherein K, $C_{Dmin}$, $C_L\alpha_0$, $C_L\alpha$, and S are constants.

51. The method of claim 50 further comprising displaying $v_c$, $y_c$, $\mu_c$, $\alpha_c$, and $T_c$, $v_{dot}^d$, $x_{dot}^d$, $Y_{dot}^d$ to an operator of the vehicle.

52. The method of claim 36 wherein the determining of a desired vehicle rate comprises performing a dynamic inversion based on the directional vehicle rate and the directional formation position error rate so as to produce the desired vehicle rate.

53. The method of claim 36 wherein the converting of the desired vehicle rate to a vehicle acceleration input comprises:
subtracting a current vehicle state from the desired vehicle rate to produce a subtraction result; and,
converting the subtraction result to the vehicle acceleration input.

54. The method of claim 53 wherein the determining of a desired vehicle rate comprises performing a dynamic inversion based on the directional vehicle rate and the directional formation position error rate so as to produce the desired vehicle rate.

55. A method of keeping position of a vehicle in a vehicle formation comprising:
receiving a track velocity input comprising $v_{track}$, $x_{track}$, and $y_{track}$;
receiving a commanded maneuver comprising $v_{dottrack}$, $x_{dottrack}$, $y_{dottrack}$; and,
determining guidance corrections based on the track velocity and the commanded maneuver during position keeping only, during a simultaneous altitude change maneuver, during a simultaneous speed change maneuver, during a simultaneous turn maneuver, during a sequential altitude change maneuver, during a sequential speed change maneuver, during a sequential turn maneuver, during a simultaneous altitude and speed change maneuver, during a simultaneous altitude change and turn maneuver, during a simultaneous turn and speed change maneuver, during a simultaneous turn and altitude and speed change maneuver, during any and all pending maneuvers, during sequential altitude and speed change maneuvers, during a sequential altitude change and turn maneuver, during a sequential altitude change and turn maneuver, during a sequential turn and speed change maneuver, and during a sequential turn and altitude and speed change maneuver.

56. The method of claim 55 wherein at least some of the sequential maneuvers are performed based on a time delay, and wherein the time delay is equal to the time required for the follower to cover a desired distance between the position of the follower when a leader begins the maneuver and the position of the leader where the leader begins the maneuver.

57. The method of claim 56 wherein $v_{track}=v_{com}$, $x_{track}=x_{com}$, $y_{track}=0$, $v_{dottrack}=0$, $x_{dottrack}=0$, and $y_{dottrack}=0$ during position keeping only, wherein $v_{track}=v_{com}$, $x_{track}=x_{com}$, $y_{track}=\sin^{-1}(h_{dotcom}/v_{track})$, $v_{dottrack}=0$, $x_{dottrack}=0$, and $y_{dottrack}=0$ during a simultaneous altitude change maneuver, wherein $v_{track}=v_L(t)$, $x_{track}=x_{com}$, $y_{track}=0$, $v_{dottrack}=v_{dotcom}$, $x_{dottrack}=0$, and $y_{dottrack}=0$ during a simultaneous speed change maneuver, wherein $v_{track}=v_L(t)\pm\Delta v_{turn}(t)$, $x_{track}=x_L$, $y_{track}=0$, $v_{dottrack}=0$, $x_{dottrack}=x_{dotcom}$, and $y_{dottrack}=0$ during a simultaneous turn maneuver, where $v_{track}=v_{com}$, $x_{track}=x_{com}$, $y_{track}=\sin^{-1}(h_{dotcom}/v_{track})$, $v_{dottrack}=0$, $x_{dottrack}=0$, and $y_{dottrack}=0$ during a sequential speed change maneuver, wherein $v_{track}=v_L(t)$, $x_{track}=x_{com}$, $y_{track}=0$, $v_{dottrack}=v_{dotcom}$, $x_{dottrack}=0$, and $y_{dottrack}=0$ during a sequential altitude change maneuver, wherein $v_{track}=v_L(t-t_{delay})$, $x_{track}=x_{com}$, $y_{track}=0$, $v_{dottrack}=v_{dotcom}$, $x_{dottrack}=0$, and $y_{dottrack}=0$ during a sequential speed change maneuver, wherein $v_{track}=v_L(t-t_{delay})\pm\Delta v_{turn}(t-t_{delay})$, $x_{track}=x_L(t-t_{delay})$, $y_{track}=0$, $v_{dottrack}=0$, $x_{dottrack}=x_{dotcom}$, and $y_{dottrack}=0$ during a sequential turn maneuver, wherein $v_{track}=v_L(t)$, $x_{track}=x_{com}$, $y_{track}=\sin^{-1}(h_{dotcom}/v_{track})$, $v_{dottrack}=v_{dotcom}$, $x_{dottrack}=0$, and $y_{dottrack}=0$ during a simultaneous altitude and speed change maneuver, wherein $v_{track}=v_L(t)\pm\Delta V_{turn}(t)$, $x_{track}=x_L(t)$, $y_{track}=\sin^{-1}(h_{dotcom}/v_{track})$, $v_{dottrack}=0$, $x_{dottrack}=x_{dotcom}$, and $y_{dottrack}=0$ during a simultaneous altitude change and turn maneuver, wherein $v_{track}=v_L(t)\pm\Delta v_{turn}(t)$, $x_{track}=x_L(t)$, $y_{track}=0$ during a simultaneous turn and speed change maneuver, wherein $v_{track}=v_L(t)\pm\Delta v_{turn}(t)$, $x_{track}=x_L(t)$, $y_{track}=\sin^{-1}(h_{dotcom}/v_{track})$, $v_{dottrack}=v_{dotcom}$, $x_{dottrack}=x_{dotcom}$, and $y_{dottrack}=0$ during a simultaneous turn and altitude and speed change maneuver, wherein $v_{track}=(v_L^{PK}(t_{startment})-x_F^{PK}(t))/(t_{startment}-t)$, $x_{track}=x_{com}$, and $y_{track}=0$, $v_{dottrack}=0$, $x_{dottrack}=0$, $y_{dottrack}=0$, during any and all pending maneuvers, wherein $v_{track}=v_{com}(t-t_{delay})$, $x_{track}=x_{com}$, $y_{track}=\sin^{-1}(h_{dotcom}/v_{track})$, $v_{dottrack}=v_{dotcom}$, $x_{dottrack}=0$, and $y_{dottrack}=0$ during a sequential altitude and speed change maneuver, wherein $v_{track}=v_L(t-t_{delay})$, $x_{track}=x_L(t-t_{delay})$, $y_{track}=\sin^{-1}(h_{dotcom}/v_{track})$, $v_{dottrack}=0$, $x_{dottrack}=x_{dotcom}$, and $y_{dottrack}=0$ during a sequential altitude change and turn maneuver, wherein $v_{track}=v_L(t-t_{delay})\pm\Delta v_{turn}(t)$, $x_{track}=x_L(t-t_{delay})$, $y_{track}=0$, $v_{dottrack}=v_{dotcom}$, $x_{dottrack}=x_{dotcom}$, and $y_{dottrack}=0$ during a sequential turn and speed change maneuver, and wherein $v_{track}=v_L(t-t_{delay})\pm\Delta v_{turn}(t-t_{delay})$, $x_{track}=x_L(t-t_{delay})$, $y_{track}=\sin^{-1}(h_{dotcom}/v_{track})$, $v_{dottrack}=v_{dotcom}$, $x_{dottrack}=x_{dotcom}$, and $y_{dottrack}=0$ during a sequential turn and altitude and speed change maneuver, wherein the com subscript designates a leader value, wherein the L subscript designates a leader value, wherein the F subscript designates a follower value, wherein $h_{dotcom}$ designates a command altitude rate, wherein dotcom subscript designates a commenced rate value, wherein $t_{startment}$ designates the time at which the leader starts the maneuver, wherein $t_{delay}$ designates the time required for a follower to cover a distance between the position of the follower when a leader begins the maneuver and the position of the leader where the leader begins the maneuver, wherein $x_L^{PK}$ designates a position of a leader in a position keeping reference frame, and wherein $x_F^{PK}$ designates a position of a follower in the position keeping reference frame.

58. The method of claim 55 wherein the determining of guidance corrections comprises determining the guidance corrections additionally during a drop maneuver alone and with any of the maneuvers except a turn maneuver.

59. A method of deterring a formation error vector e in a position of a vehicle with respect to a leader L in a vehicle formation comprising:
   determining a position vector $\Delta x$ based upon a position $x_v$ of the vehicle and a position $x_L$ of the leader;
   comparing the position vector $\Delta x$ to a desired relative position vector $\Delta x_{ref}$, wherein the desired relative position vector $\Delta x_{ref}$ designates a desired relative position between the vehicle and the leader; and,
   determining the formation error vector e based on a result or the comparison.

60. The method of claim 59 further comprising displaying the formation error vector e to the vehicle.

61. The method of claim 59 wherein certain sequential maneuvers of the vehicle are delayed by a time delay $t_{delay}$, and wherein the time delay $t_{delay}$ is equal to the time required for the vehicle to cover a distance between the location of the vehicle when a leader begins the certain sequential maneuvers and the location of the leader where the leader begins the sequential maneuvers.

62. The method of claim 61 further comprising displaying the formation error vector e to the vehicle.

63. The method of claim 59 wherein the formation error vector e, the position vector $\Delta x$, the position $x_v$ of the vehicle, the position $x_L$ of the leader, and the desired relative position vector $\Delta x_{ref}$ are based on a position keeping reference frame PK such that $e=e^{PK}$, $\Delta x=\Delta x^{PK}$, $x_v=x_v$, $x_L=x_L$, and $\Delta x_{ref}=\Delta x_{ref}^{PK}$.

64. The method of claim 63 wherein $e^{PK}=\Delta x^{PK}-\Delta x_{ref}^{PK}$, and $\Delta x^{PK}=x_L^{PK}(t)-x_v^{PK}(t)$ for position keeping.

65. The method of claim 64 further comprising displaying the formation error vector $e^{PK}$ to the vehicle.

66. The method of claim 63 wherein $e^{PK}=\Delta x^{PK}-\Delta x_{ref}^{PK}$, and $\Delta x^{PK}=x_L^{PK}(t)-x_v^{PK}(t)$ for simultaneous maneuvers.

67. The method of claim 63 wherein $e^{PK}=\Delta x^{PK}-\Delta x_{ref}^{PK}$, and $\Delta x^{PK}=x_L^{PK}(t-t_{delay})-x_v^{PK}(t)$ for sequential maneuvers, and wherein $t_{delay}$ is equal to the time required for the vehicle to cover a distance between the location of the vehicle when a leader begins the sequential maneuvers and the location of the leader where the leader begins the sequential maneuvers.

68. The method of claim 63 $e^{PK}=\Delta x^{PK}-\Delta x_{ref}^{PK}$, and $\Delta x^{PK}=x_L^{PK}(t_{startman})-x_v^{PK}(t_{startman})$ for pending maneuvers, and wherein ($t_{startman}$) is the time at which the leader starts a maneuver.

69. The method of claim 59 wherein the determining of a position of vector $\Delta x$ based upon a position $x_v$ of the vehicle and a position $x_L$ of the leader comprises determining the position vector $\Delta x$ based upon a position $\Delta_v$ of the vehicle, a position $x_L$ of the leader, and a commanded altitude.

70. A method of executing a sequential maneuver by a follower F following a leader L in a vehicle formation comprising:
   once the leader begins execution of the sequential maneuver, waiting to execute the sequential maneuver;
   during the waiting, guiding the follower to a location occupied by the leader at the time that the leader began the sequential maneuver; and,
   initiating execution of the sequential maneuver when the follower arrives at the location.

71. The method of claim 70 wherein the guiding of the follower comprises:
   determining a formation error vector e relating to a position of the follower in relation to the leader in the vehicle formation; and,
   setting a longitudinal component of the formation vector to 0 during the waiting.

72. The method of claim 70 wherein the guiding of the follower comprises:
   determining a delay time $t_{delay}$ required for the follower to reach the location; and,
   controlling speed so that, upon expiration of the delay time $t_{delay}$, the follower reaches the location.

73. The method of claim 72 wherein the determining of a delay time $t_{delay}$ comprises determining the delay time $t_{delay}$ according to the following equation:

$$t_{delay}=\Delta x_{nom}(t_{startman})/c_{com}(t_{startman})$$

where $t_{startman}$ is the time at which the leader starts the sequential maneuver, $x_{nom}$ is the nominal desired longitudinal separation between the follower and the leader at the time that the leader starts the sequential maneuver, and $v_{com}$ is a commanded ground speed.

74. The method of claim 72 wherein the guiding of the follower comprises:
   determining a formation error vector e relating to a position of the follower in relation to the leader in the vehicle formation; and,
   setting a longitudinal component of the formation vector to 0 during the waiting.

75. The method of claim 74 wherein the determining of the a delay time $t_{delay}$ comprises determining the delay time $t_{delay}$ according to the following equation:

$$t_{delay}=\Delta x_{nom}(t_{startman})/v_{com}(t_{startman})$$

where $t_{startman}$ is the time at which the leader starts the sequential maneuver, $\Delta x_{nom}$ is the nominal desired longitudinal separation between the follower and the leader at the time that the leader starts the sequential maneuver, and $v_{com}$ is a commanded ground speed.

76. A method of keeping position of a vehicle in a vehicle formation comprising:
   determining guidance corrections to execute a combined maneuver of the vehicle in the vehicle formation, wherein the combined maneuver comprises a combination of at least two simple maneuvers, and wherein the combined maneuver is commanded by a leader of the vehicle formation; and,
   guiding the vehicle through the combined maneuver based on the guidance corrections, wherein the determining of guidance corrections comprises determining guidance corrections based on a commanded ground speed, a commanded flight path angle, and a commanded track angle.

77. The method of claim 76 wherein the combined maneuver comprises combined speed and altitude changes.

78. The method of claim 76 wherein the combined maneuver comprises combined speed change and turn.

79. The method of claim 76 wherein the combined maneuver comprises a combined altitude change and turn.

80. The method of claim 76 wherein the combined maneuver comprises a combined speed and altitude change and turn.

81. A method of keeping a position of a vehicle in a vehicle formation comprising:

determining guidance corrections to execute a commanded maneuver of the vehicle in the vehicle formation and to maintain the position of the vehicle in the vehicle formation; and, displaying the guidance corrections on a primary flight display to an operator of the vehicle, wherein the displayed guidance corrections comprise a course change countdown, and wherein the course change countdown indicates time remaining in a pending maneuver.

82. The method of claim 81 wherein the displayed guidance corrections comprise a speed target for the vehicle.

83. The method of claim 81 wherein the displayed guidance corrections comprise an altitude target for the vehicle.

84. The method of claim 81 wherein the displayed guidance corrections comprising a heading target for the vehicle.

85. The method of claim 81 wherein the displayed guidance corrections comprise a speed target and an altitude target for the vehicle.

86. The method of claim 81 wherein the displayed guidance corrections comprise a speed target and an altitude target for the vehicle.

87. The method of claim 81 wherein the displayed guidance corrections comprise a heading target and an altitude target for the vehicle.

88. The method of claim 81 wherein the displayed guidance corrections comprise a speed target, a heading target, and an altitude target for the vehicle.

89. The method of claim 81 wherein the displayed guidance corrections comprise a longitudinal track deviation of the vehicle.

90. The method of claim 81 wherein the displayed guidance corrections comprise a lateral deviation of the vehicle.

91. The method of claim 81 wherein the displayed guidance corrections comprise a vertical deviation of the vehicle.

92. The method of claim 81 wherein the displayed guidance corrections comprise a longitudinal deviation and a lateral deviation of the vehicle.

93. The method of claim 81 wherein the displayed guidance corrections comprise a longitudinal deviation and a vertical deviation of the vehicle.

94. The method of claim 81 wherein the displayed guidance corrections comprise a lateral deviation and a vertical deviation of the vehicle.

95. The method of claim 81 wherein the displayed guidance corrections comprise a longitudinal deviation, a lateral deviation, and a vertical deviation of the vehicle.

96. A method of keeping position of a vehicle in a vehicle formation comprising:

determining guidance corrections to execute a combined maneuver of the vehicle in the vehicle formation, wherein the combined maneuver comprises a combination of at least two maneuvers, and wherein the combined maneuver is commanded by a leader of the vehicle formation; and guiding the vehicle through time combined maneuver based on the guidance corrections, wherein the determining of guidance corrections comprises determining guidance corrections based on a commanded acceleration, a command flight path angle, and a commanded track angle rate.

97. A method of keeping a position of a vehicle in a vehicle formation comprising:

determining guidance corrections to execute a commanded maneuver of the vehicle in the vehicle formation and to maintain the position of the vehicle in the vehicle formation; and displaying the guidance corrections on a primary flight display to an operator of the vehicle, wherein the displayed guidance corrections comprise a course change countdown, and wherein the course change countdown indicates time remaining in a pending maneuver wherein the displayed guidance corrections comprise a course change countdown, and wherein the course change countdown indicates the time remaining until a simultaneous maneuver is performed.

* * * * *